(12) United States Patent  (10) Patent No.: US 8,908,307 B1
Yang et al.  (45) Date of Patent: Dec. 9, 2014

(54) SYSTEMS AND METHODS FOR HARD DISK DRIVE REGION BASED DATA ENCODING

(71) Applicant: LSI Corporation, San Jose, CA (US)

(72) Inventors: Shaohua Yang, San Jose, CA (US); Bruce A. Wilson, San Jose, CA (US)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 14/026,722

(22) Filed: Sep. 13, 2013

Related U.S. Application Data

(60) Provisional application No. 61/869,644, filed on Aug. 23, 2013.

(51) Int. Cl.
G11B 5/09 (2006.01)
G11B 27/10 (2006.01)
G11B 20/18 (2006.01)
G11B 20/10 (2006.01)

(52) U.S. Cl.
CPC .......... *G11B 27/105* (2013.01); *G11B 20/1816* (2013.01); *G11B 2020/10916* (2013.01)
USPC .................................. 360/40; 360/39; 360/53

(58) Field of Classification Search
None
See application file for complete search history.

(56) References Cited

U.S. PATENT DOCUMENTS

| | | | |
|---|---|---|---|
| 4,553,221 A | 11/1985 | Hyatt | |
| 4,805,174 A | 2/1989 | Kubota | |
| 5,278,703 A | 1/1994 | Rub et al. | |
| 5,278,846 A | 1/1994 | Okayama | |
| 5,317,472 A | 5/1994 | Schweitzer, III | |
| 5,325,402 A | 6/1994 | Ushirokawa | |
| 5,351,274 A | 9/1994 | Chennakeshu | |
| 5,392,299 A | 2/1995 | Rhines | |
| 5,406,593 A | 4/1995 | Chennakeshu | |
| 5,417,500 A | 5/1995 | Martinie | |
| 5,450,253 A | 9/1995 | Seki | |
| 5,513,192 A | 4/1996 | Janku | |
| 5,523,903 A | 6/1996 | Hetzler | |
| 5,550,810 A | 8/1996 | Monogioudis et al. | |
| 5,550,870 A | 8/1996 | Blaker | |
| 5,612,964 A | 3/1997 | Haraszti | |
| 5,696,504 A | 12/1997 | Oliveros | |
| 5,710,784 A | 1/1998 | Kindred | |
| 5,717,706 A | 2/1998 | Ikeda | |
| 5,719,871 A | 2/1998 | Helm | |
| 5,802,118 A | 9/1998 | Bliss | |
| 5,844,945 A | 12/1998 | Nam | |

(Continued)

FOREIGN PATENT DOCUMENTS

| | | |
|---|---|---|
| JP | 2001/319433 A | 11/2001 |
| WO | WO 2010/059264 A1 | 5/2010 |
| WO | WO 2010/126482 A1 | 11/2010 |

OTHER PUBLICATIONS

Casado et al., Multiple-rate low-density parity-check codes with constant blocklength, IEEE Transations on communications, Jan. 2009, vol. 57, pp. 75-83.

(Continued)

*Primary Examiner* — Dismery Mercedes
(74) *Attorney, Agent, or Firm* — Hamilton DeSanctis & Cha

(57) ABSTRACT

Systems and method relating generally to improving usage of storage area on a disk drive, and more particularly to systems and methods for applying encoding based upon the nature of a particular region of a disk platter on the disk drive.

20 Claims, 8 Drawing Sheets

(56) References Cited

U.S. PATENT DOCUMENTS

| | | | | |
|---|---|---|---|---|
| 5,898,710 | A | 4/1999 | Amrany | |
| 5,923,713 | A | 7/1999 | Hatakeyama | |
| 5,978,414 | A | 11/1999 | Nara | |
| 5,983,383 | A | 11/1999 | Wolf | |
| 6,005,897 | A | 12/1999 | Mccallister | |
| 6,023,384 | A * | 2/2000 | Anderson et al. | 360/48 |
| 6,023,783 | A | 2/2000 | Divsalar | |
| 6,029,264 | A | 2/2000 | Kobayashi | |
| 6,055,121 | A * | 4/2000 | Du et al. | 360/77.07 |
| 6,065,149 | A | 5/2000 | Yamanaka | |
| 6,097,764 | A | 8/2000 | McCallister | |
| 6,137,644 | A * | 10/2000 | Hetzler et al. | 360/48 |
| 6,145,110 | A | 11/2000 | Khayrallah | |
| 6,175,588 | B1 | 1/2001 | Visotsky | |
| 6,216,249 | B1 | 4/2001 | Bliss | |
| 6,216,251 | B1 | 4/2001 | McGinn | |
| 6,266,795 | B1 | 7/2001 | Wei | |
| 6,317,472 | B1 | 11/2001 | Choi | |
| 6,351,832 | B1 | 2/2002 | Wei | |
| 6,377,610 | B1 | 4/2002 | Hagenauer | |
| 6,381,726 | B1 | 4/2002 | Weng | |
| 6,393,074 | B1 | 5/2002 | Mandyam | |
| 6,412,088 | B1 | 6/2002 | Patapoutian et al. | |
| 6,473,878 | B1 | 10/2002 | Wei | |
| 6,535,553 | B1 | 3/2003 | Limberg et al. | |
| 6,625,775 | B1 | 9/2003 | Kim | |
| 6,643,814 | B1 | 11/2003 | Cideciyan et al. | |
| 6,697,441 | B1 | 2/2004 | Bottomley | |
| 6,747,827 | B1 | 6/2004 | Bassett et al. | |
| 6,748,034 | B2 | 6/2004 | Hattori | |
| 6,757,862 | B1 | 6/2004 | Marianetti, II | |
| 6,785,863 | B2 | 8/2004 | Blankenship | |
| 6,807,238 | B1 * | 10/2004 | Rhee et al. | 375/340 |
| 6,810,502 | B2 | 10/2004 | Eidson | |
| 6,839,774 | B1 | 1/2005 | Ahn et al. | |
| 6,948,113 | B1 | 9/2005 | Shaver | |
| 6,957,379 | B1 * | 10/2005 | Patapoutian et al. | 714/774 |
| 6,970,511 | B1 | 11/2005 | Barnette | |
| 6,975,692 | B2 | 12/2005 | Razzell | |
| 6,986,098 | B2 | 1/2006 | Poeppelman | |
| 7,035,327 | B2 | 4/2006 | Nakajima et al. | |
| 7,046,467 | B1 * | 5/2006 | Chheda | 360/51 |
| 7,047,474 | B2 | 5/2006 | Rhee | |
| 7,058,873 | B2 | 6/2006 | Song et al. | |
| 7,073,118 | B2 | 7/2006 | Greenberg | |
| 7,093,179 | B2 | 8/2006 | Shea | |
| 7,117,427 | B2 | 10/2006 | Ophir | |
| 7,133,228 | B2 | 11/2006 | Fung | |
| 7,136,244 | B1 | 11/2006 | Rothberg | |
| 7,184,486 | B1 | 2/2007 | Wu | |
| 7,191,378 | B2 | 3/2007 | Eroz | |
| 7,203,887 | B2 | 4/2007 | Eroz | |
| 7,230,550 | B1 | 6/2007 | Mittal | |
| 7,237,181 | B2 | 6/2007 | Richardson | |
| 7,308,061 | B1 | 12/2007 | Huang | |
| 7,310,768 | B2 | 12/2007 | Eidson | |
| 7,313,750 | B1 | 12/2007 | Feng | |
| 7,370,258 | B2 | 5/2008 | Iancu | |
| 7,415,651 | B2 | 8/2008 | Argon | |
| 7,499,233 | B1 * | 3/2009 | Han et al. | 360/65 |
| 7,502,189 | B2 | 3/2009 | Sawaguchi | |
| 7,523,375 | B2 | 4/2009 | Spencer | |
| 7,587,657 | B2 | 9/2009 | Haratsch | |
| 7,589,925 | B1 * | 9/2009 | Chiao et al. | 360/48 |
| 7,590,168 | B2 | 9/2009 | Raghavan | |
| 7,596,196 | B1 | 9/2009 | Liu et al. | |
| 7,646,829 | B2 | 1/2010 | Ashley | |
| 7,702,986 | B2 | 4/2010 | Bjerke | |
| 7,738,202 | B1 | 6/2010 | Zheng | |
| 7,752,523 | B1 | 7/2010 | Chaichanavong | |
| 7,779,325 | B2 | 8/2010 | Song | |
| 7,802,172 | B2 | 9/2010 | Vila Casado et al. | |
| 7,952,824 | B2 | 5/2011 | Dziak | |
| 7,957,251 | B2 | 6/2011 | Ratnakar Aravind | |
| 7,958,425 | B2 | 6/2011 | Chugg | |
| 7,996,746 | B2 | 8/2011 | Livshitz | |
| 8,018,360 | B2 | 9/2011 | Nayak | |
| 8,020,069 | B1 | 9/2011 | Feng | |
| 8,020,078 | B2 | 9/2011 | Richardson | |
| 8,094,396 | B1 * | 1/2012 | Zhang et al. | 360/31 |
| 8,161,361 | B1 | 4/2012 | Song et al. | |
| 8,201,051 | B2 | 6/2012 | Tan | |
| 8,225,168 | B2 | 7/2012 | Yu et al. | |
| 8,237,597 | B2 | 8/2012 | Liu | |
| 8,243,381 | B2 * | 8/2012 | Annampedu et al. | 360/51 |
| 8,245,111 | B2 * | 8/2012 | Chishti et al. | 714/766 |
| 8,255,765 | B1 | 8/2012 | Yeo | |
| 8,261,171 | B2 | 9/2012 | Annampedu | |
| 8,291,284 | B2 | 10/2012 | Savin | |
| 8,291,299 | B2 | 10/2012 | Li et al. | |
| 8,295,001 | B2 | 10/2012 | Liu | |
| 8,296,637 | B1 | 10/2012 | Varnica | |
| 8,370,711 | B2 | 2/2013 | Alrod | |
| 8,381,069 | B1 | 2/2013 | Liu | |
| 8,413,032 | B1 | 4/2013 | Song | |
| 8,429,498 | B1 * | 4/2013 | Anholt et al. | 714/764 |
| 8,443,267 | B2 | 5/2013 | Zhong et al. | |
| 8,458,555 | B2 | 6/2013 | Gunnam | |
| 8,464,142 | B2 | 6/2013 | Gunnam | |
| 8,495,462 | B1 | 7/2013 | Liu | |
| 8,516,339 | B1 | 8/2013 | Lesea | |
| 8,527,849 | B2 | 9/2013 | Jakab | |
| 2001/0010089 | A1 | 7/2001 | Gueguen | |
| 2001/0016114 | A1 | 8/2001 | Van Gestel et al. | |
| 2002/0021519 | A1 | 2/2002 | Rae | |
| 2002/0067780 | A1 | 6/2002 | Razzell | |
| 2002/0168033 | A1 | 11/2002 | Suzuki | |
| 2003/0031236 | A1 | 2/2003 | Dahlman | |
| 2003/0123364 | A1 | 7/2003 | Nakajima et al. | |
| 2003/0126527 | A1 | 7/2003 | Kim | |
| 2003/0138102 | A1 | 7/2003 | Kohn et al. | |
| 2003/0147168 | A1 | 8/2003 | Galbraith et al. | |
| 2003/0188252 | A1 | 10/2003 | Kim et al. | |
| 2004/0042436 | A1 | 3/2004 | Terry et al. | |
| 2004/0194007 | A1 | 9/2004 | Hocevar | |
| 2004/0228021 | A1 | 11/2004 | Yamazaki | |
| 2004/0264284 | A1 | 12/2004 | Priborsky et al. | |
| 2005/0047514 | A1 | 3/2005 | Bolinth | |
| 2005/0149842 | A1 | 7/2005 | Kyung | |
| 2005/0210367 | A1 | 9/2005 | Ashikhmin | |
| 2005/0243456 | A1 | 11/2005 | Mitchell et al. | |
| 2006/0159355 | A1 | 7/2006 | Mizuno | |
| 2006/0195730 | A1 | 8/2006 | Kageyama | |
| 2007/0025006 | A1 * | 2/2007 | Ichihara | 360/31 |
| 2007/0185902 | A1 | 8/2007 | Messinger et al. | |
| 2007/0234178 | A1 | 10/2007 | Richardson | |
| 2008/0037676 | A1 | 2/2008 | Kyung et al. | |
| 2008/0069373 | A1 | 3/2008 | Jiang | |
| 2008/0130153 | A1 * | 6/2008 | Lee et al. | 360/48 |
| 2008/0140686 | A1 | 6/2008 | Hong | |
| 2008/0304558 | A1 | 12/2008 | Zhu et al. | |
| 2009/0003301 | A1 | 1/2009 | Reial | |
| 2009/0092174 | A1 | 4/2009 | Wang | |
| 2009/0106633 | A1 | 4/2009 | Fujiwara | |
| 2009/0125780 | A1 | 5/2009 | Taylor | |
| 2009/0132893 | A1 | 5/2009 | Miyazaki | |
| 2009/0150745 | A1 | 6/2009 | Langner et al. | |
| 2009/0177852 | A1 | 7/2009 | Chen | |
| 2009/0185643 | A1 | 7/2009 | Fitzpatrick | |
| 2009/0216942 | A1 | 8/2009 | Yen | |
| 2009/0273492 | A1 | 11/2009 | Yang et al. | |
| 2010/0077276 | A1 | 3/2010 | Okamura et al. | |
| 2010/0088575 | A1 | 4/2010 | Sharon et al. | |
| 2010/0150252 | A1 | 6/2010 | Camp | |
| 2010/0241928 | A1 * | 9/2010 | Kim et al. | 714/763 |
| 2010/0268996 | A1 | 10/2010 | Yang | |
| 2010/0322048 | A1 | 12/2010 | Yang et al. | |
| 2010/0325511 | A1 * | 12/2010 | Oh et al. | 714/752 |
| 2011/0041040 | A1 | 2/2011 | Su | |
| 2011/0043938 | A1 | 2/2011 | Mathew | |
| 2011/0066768 | A1 | 3/2011 | Brittner et al. | |
| 2011/0167227 | A1 | 7/2011 | Yang | |
| 2011/0258508 | A1 | 10/2011 | Ivkovic | |
| 2011/0264987 | A1 | 10/2011 | Li | |

(56) References Cited

U.S. PATENT DOCUMENTS

| | | |
|---|---|---|
| 2011/0307760 A1 | 12/2011 | Pisek |
| 2011/0320902 A1 | 12/2011 | Gunnam |
| 2012/0020402 A1 | 1/2012 | Ibing |
| 2012/0038998 A1 | 2/2012 | Mathew |
| 2012/0063023 A1 | 3/2012 | Mathew |
| 2012/0079353 A1 | 3/2012 | Liikanen |
| 2012/0124118 A1 | 5/2012 | Ivkovic |
| 2012/0182643 A1 | 7/2012 | Zhang |
| 2012/0185744 A1 | 7/2012 | Varnica |
| 2012/0203986 A1 | 8/2012 | Strasser et al. |
| 2012/0207201 A1 | 8/2012 | Xia |
| 2012/0236428 A1 | 9/2012 | Xia |
| 2012/0262814 A1 | 10/2012 | Li |
| 2012/0265488 A1 | 10/2012 | Sun |
| 2012/0317462 A1 | 12/2012 | Liu et al. |
| 2013/0024740 A1 | 1/2013 | Xia |
| 2013/0031440 A1 | 1/2013 | Sharon |
| 2013/0120169 A1 | 5/2013 | Li |
| 2013/0194955 A1 | 8/2013 | Chang |
| 2013/0198580 A1 | 8/2013 | Chen |
| 2013/0238955 A1 | 9/2013 | D'Abreu |
| 2014/0036383 A1* | 2/2014 | Cideciyan et al. .............. 360/55 |

OTHER PUBLICATIONS

Cui et al., "High-Throughput Layered LDPC Decoding Architecture", IEEE Transactions on Very Large Scale Integration (VLSI) Systems, vol. 17, No. 4 (Apr. 2009).
Fan et al., "Constrained coding techniques for soft iterative decoders" Proc. IEEE Global Telecommun. Conf., vol. 1b, pp. 631-637 (1999).
Fossorier, Marc P.C. "Quasi-Cyclic Low-Density Parity-Check Codes From Circulant Permutation Maricies" IEEE Transactions on Information Theory, vol. 50, No. 8 Aug. 8, 2004.
Gross, "Stochastic Decoding of LDPC Codes over GF(q)", HDPCC Workshop, Tel Aviv (Mar. 2, 2010).
Gunnam et al., "VLSI Architectures for Layered Decoding for Irregular LDPC Codes of WiMax", IEEE ICC Proceedings (2007).
Hagenauer, J. et al A Viterbi Algorithm with Soft-Decision Outputs and its Applications in Proc. IEEE Globecom, pp. 47. 11-47 Dallas, TX Nov. 1989.
Han and Ryan, "Pinning Techniques for Low-Floor Detection/Decoding of LDPC-Coded Partial Response Channels", 5th International Symposium on Turbo Codes &Related Topics, 2008.
Kautz, "Fibonacci Codes for Synchronization Control", IEEE Trans. Info. Theory, vol. 11, No. 2, pp. 284-292 (Apr. 1965).
Kschischang et al., "Factor Graphs and the Sum-Product Algorithm", IEEE Transactions on Information Theory, vol. 47, No. 2 (Feb. 2001).
Leduc-Primeau et al., "A Relaxed Half-Stochastic Iterative Decoder for LDPC Codes", IEEE Communications Society, IEEE Globecom proceedings (2009).
Lee et al., "Partial Zero-Forcing Adaptive MMSE Receiver for DS-CDMA Uplink in Multicell Environments" IEEE Transactions on Vehicular Tech. vol. 51, No. 5, Sep. 2002.
Li et al "Efficient Encoding of Quasi-Cyclic Low-Density Parity Check Codes" IEEE Transactions on Communications on 53 (11) 1973-1973, 2005.
Lim et al. "Convergence Analysis of Constrained Joint Adaptation in Recording Channels" IEEE Trans. on Signal Processing vol. 54, No. 1 Jan. 2006.
Lin et al "An efficient VLSI Architecture for non binary LDPC decoders"—IEEE Transaction on Circuits and Systems II vol. 57, Issue 1 (Jan. 2010) pp. 51-55.
Moon et al, "Pattern-dependent noise prediction in signal-dependent Noise," IEEE JSAC, vol. 19, No. 4 pp. 730-743, Apr. 2001.
Moon et al., "Maximum transition run codes for data storage systems", IEEE Trans. Magn., vol. 32, No. 5, pp. 3992-3994 (Sep. 1996).
Patapoutian et al "Improving Re-Read Strategies by Waveform Averaging" IEEE Transactions on Mag. vol. 37 No. 6, Nov. 2001.
Planjery et al "Finite Alphabet Iterative Decoders, pt 1: Decoding Beyond Beliver Propogation on BSC" Jul. 2012, printed from the internet Apr. 21, 2014 http://arxiv.org/pdf/1207.4800.pd.
Richardson, T "Error Floors of LDPC Codes" Flarion Technologies Bedminster NJ 07921, tjr@flarion.com (not dated).
Shokrollahi "LDPC Codes: An Introduction", Digital Fountain, Inc. (Apr. 2, 2003).
Spagnol et al, "Hardware Implementation of GF(2m) LDPC Decoders", IEEE Transactions on Circuits and SystemsSI : Regular Papers, vol. 56, No. 12 (Dec. 2009).
Tehrani et al., "Fully Parallel Stochastic LDPC Decoders", IEEE Transactions on Signal Processing, vol. 56, No. 11 (Nov. 2008).
Todd et al., "Enforcing maximum-transition-run code constraints and low-density parity check decoding", IEEE Trans. Magn., vol. 40, No. 6, pp. 3566-3571 (Nov. 2004).
U.S. Appl. No. 13/305,510, filed Nov. 28, 2011, Lei Chen, Unpublished.
U.S. Appl. No. 13/186,234, filed Jul. 19, 2011, Haitao Xia, Unpublished.
U.S. Appl. No. 13/213,751, filed Aug. 19, 2011, Fan Zhang, Unpublished.
U.S. Appl. No. 13/545,833, filed Jul. 10, 2012, Zhi Bin Li, Unpublished.
U.S. Appl. No. 14/025,104, filed Sep. 12, 2013, Bruce Wilson, Unpublished.
U.S. Appl. No. 13/340,974, filed Dec. 30, 2011, Dan Liu, Unpublished.
U.S. Appl. No. 13/340,951, filed Dec. 30, 2011, Lei Chen, Unpublished.
U.S. Appl. No. 13/369,468, filed Feb. 9, 2012, Zongwang Li, Unpublished.
U.S. Appl. No. 13/283,549, filed Oct. 27, 2011, Wu Chang, Unpublished.
U.S. Appl. No. 13/180,495, filed Jul. 11, 2011, Chung-Li Wang, Unpublished.
U.S. Appl. No. 13/302,119, filed Nov. 22, 2011, Lei Chen, Unpublished.
U.S. Appl. No. 13/227,416, filed Sep. 7, 2011, Lei Chen, Unpublished.
U.S. Appl. No. 13/305,551, filed Nov. 28, 2011, Yang Han, Unpublished.
U.S. Appl. No. 13/296,022, filed Nov. 14, 2011, Victor Krachkovsky, Unpublished.
U.S. Appl. No. 13/445,878, filed Apr. 12, 2012, Yu Liao, Unpublished.
U.S. Appl. No. 13/174,537, filed Jun. 30, 2011, Anantha Raman Krishnan, Unpublished.
U.S. Appl. No. 13/174,453, filed Jun. 30, 2011, Johnson Yen, Unpublished.
U.S. Appl. No. 13/171,615, filed Jun. 29, 2011, Bradley D. Seago, Unpublished.
U.S. Appl. No. 13/239,683, filed Sep. 22, 2011, Changyou Xu, Unpublished.
U.S. Appl. No. 13/327,279, filed Dec. 15, 2011, Wei Feng, Unpublished.
U.S. Appl. No. 13/300,078, filed Nov. 18, 2011, Chung-Li Wang, Unpublished.
U.S. Appl. No. 13/945,787, filed Jul. 18, 2013, Shu Li, Unpublished.
U.S. Appl. No. 13/415,326, filed Mar. 8, 2012, Shaohua Yang, Unpublished.
U.S. Appl. No. 13/705,407, filed Dec. 5, 2012, Lingyan Sun, Unpublished.
U.S. Appl. No. 13/227,544, filed Sep. 8, 2011, Shaohua Yang, Unpublished.
U.S. Appl. No. 13/483,105, filed May 30, 2012, Xuebin Wu, Unpublished.
U.S. Appl. No. 13/445,848, filed Apr. 12, 2012, Bruce Wilson, Unpublished.
U.S. Appl. No. 13/426,693, filed Mar. 22, 2012, Shaohua Yang, Unpublished.
U.S. Appl. No. 13/652,012, filed Oct. 15, 2012, Fan Zhang, Unpublished.
U.S. Appl. No. 13/746,301, filed Jan. 21, 2013, Shu Li, Unpublished.
U.S. Appl. No. 13/766,911, filed Feb. 14, 2013, Shaohua Yang, Unpublished.

(56) References Cited

OTHER PUBLICATIONS

U.S. Appl. No. 13/415,430, filed Mar. 8, 2012, Nayak Ratnakar Aravind, Unpublished.
U.S. Appl. No. 13/875,357, filed May 2, 2013, Shaohua Yang, Unpublished.
U.S. Appl. No. 13/483,100, filed May 30, 2012, Fan Zhang, Unpublished.
U.S. Appl. No. 13/945,777, filed Jul. 18, 2013, Shu Li, Unpublished.
U.S. Appl. No. 13/944,966, filed Jul. 18, 2013, Fan Zhang, Unpublished.
U.S. Appl. No. 13/868,779, filed Apr. 23, 2013, Fan Zhang, Unpublished.
U.S. Appl. No. 13/853,711, filed Mar. 29, 2013, Shu Li, Unpublished.
U.S. Appl. No. 13/918,510, filed Jun. 14, 2013, Shu Li, Unpublished.
U.S. Appl. No. 13/770,008, filed Feb. 19, 2013, Shaohua Yang, Unpublished.
U.S. Appl. No. 13/912,059, filed Jun. 6, 2013, Fan Zhang, Unpublished.
U.S. Appl. No. 13/954,573, filed Jul. 30, 2013, Kaitlyn T. Nguyen, Unpublished.
U.S. Appl. No. 13/766,891, filed Feb. 14, 2013, Shu Li, Unpublished.
U.S. Appl. No. 13/316,741, filed Dec. 12, 2011, Yang Han, Unpublished.
U.S. Appl. No. 13/372,580, filed Feb. 14, 2012, Fan Zhang, Unpublished.
U.S. Appl. No. 13/422,986, filed Mar. 16, 2012, Fan Zhang, Unpublished.
U.S. Appl. No. 13/474,660, filed May 17, 2012, Zongwang Li, Unpublished.
U.S. Appl. No. 13/433,693, filed Mar. 29, 2012, Fan Zhang, Unpublished.
U.S. Appl. No. 13/412,520, filed Mar. 5, 2012, Fan Zhang, Unpublished.
U.S. Appl. No. 13/362,409, filed Jan. 31, 2012, Fan Zhang, Unpublished.
U.S. Appl. No. 13/113,219, filed May 23, 2011, Yang Han, Unpublished.
U.S. Appl. No. 13/316,858, filed Dec. 12, 2011, Zongwang Li, Unpublished.
U.S. Appl. No. 13/426,714, filed Mar. 22, 2012, Shaohua Yang, Unpublished.
U.S. Appl. No. 13/295,150, filed Nov. 14, 2011, Zongwang Li, Unpublished.
U.S. Appl. No. 13/284,767, filed Oct. 28, 2011, Fan Zhang, Unpublished.
U.S. Appl. No. 13/596,819, filed Aug. 28, 2012, Shaohua Yang, Unpublished.
U.S. Appl. No. 13/596,947, filed Aug. 28, 2012, Fan Zhang, Unpublished.
U.S. Appl. No. 13/596,978, filed Aug. 28, 2012, Fan Zhang, Unpublished.
U.S. Appl. No. 13/597,001, filed Aug. 28, 2012, Fan Zhang, Unpublished.
U.S. Appl. No. 13/619,907, filed Sep. 14, 2012, Fan Zhang, Unpublished.
U.S. Appl. No. 13/621,341, filed Sep. 17, 2012, Shaohua Yang, Unpublished.
U.S. Appl. No. 13/989,583, filed Oct. 15, 2012, Shaohua Yang, Unpublished.
U.S. Appl. No. 13/269,852, filed Oct. 10, 2011, Haitao Xia, Unpublished.
U.S. Appl. No. 13/269,832, filed Oct. 10, 2011, Haitao Xia, Unpublished.
U.S. Appl. No. 13/284,730, filed Oct. 28, 2011, Fan Zhang, Unpublished.
Vasic, B., "High-Rate Girth-Eight Codes on Rectangular Integer Lattices", IEEE Trans. Communications, vol. 52, Aug. 2004, pp. 1248-1252.
Vasic, B., "High-Rate Low-Density Parity-Check Codes Based on Anti-Pasch Affine Geometries," Proc ICC 2002, pp. 1332-1336.
Weon-Cheol Lee et al., "Vitierbi Decoding Method Using Channel State Info. in COFDM System" IEEE Trans. on Consumer Elect., IEEE Service Center, NY, NY vol. 45, No. 3 Aug. 1999.
Xiao, et al "Nested Codes With Multiple Interpretations" retrieved from the Internet URL: http://www.ece.nmsu.edu/~jkliewer/paper/XFKC_CISS06 (retrieved on Dec. 5, 2012).
Yeo et al., "VLSI Architecture for Iterative Decoders in Magnetic Storage Channels", Mar. 2001, pp. 748-755, IEEE trans. Magnetics, vol. 37, No. 2.
Zhang et al., "Analysis of Verification-Based Decoding on the q-ary Symmetric Channel for Large q", IEEE Trans. on Information Theory, vol. 57, No. 10 (Oct. 2011).
Zhong et al., "Design of VLSI Implementation-Oriented LDPC Codes", IEEE, pp. 670-673, 2003.
Zhong et al., "High-Rate Quasi-Cyclic LDPC Codes for Magnetic Recording Channel with Low Error Floor", ISCAS, IEEE pp. 3546-3549, May 2006.
Zhong et al., "Joint Code-Encoder Design for LDPC Coding System VLSI Implementation", ISCAS, IEEE pp. 389-392, May 2004.
Zhong et al., "Quasi Cyclic LDPC Codes for the Magnetic Recording Channel: Code Design and VSLI Implementation", IEEE Transactions on Magnetics, v. 43, pp. 1118-1123, Mar. 2007.
Zhong, "Block-LDPC: A Practical LDPC Coding System Design Approach", IEEE Trans. on Circuits, Regular Papers, vol. 5, No. 4, pp. 766-775, Apr. 2005.

\* cited by examiner

SYSTEMS AND METHODS FOR HARD DISK DRIVE REGION BASED DATA ENCODING

CROSS REFERENCE TO RELATED APPLICATIONS

The present application claims priority to (is a non-provisional of) U.S. Pat. App. No. 61/869,644 entitled "Systems and Methods for Hard Disk Drive Region Based Data Encoding", and filed Aug. 23, 2013 by Yang et al. The entirety of the aforementioned provisional patent application is incorporated herein by reference for all purposes.

FIELD OF THE INVENTION

Systems and method relating generally to improving usage of a storage medium, and more particularly to systems and methods for applying encoding based upon the nature of a particular region of the storage medium.

BACKGROUND

Typical hard disk drives store and retrieve information from a storage medium. This storage and retrieval includes encoding data written to the storage medium, and decoding information retrieved from the storage medium. The decoding is essentially the reverse of the encoding. The strength of the encoding is often a function of how many parity bits are added to the encoded user data. While stronger encoding is generally desired as it provides an ability to correct more errors, such stronger encoding, however, uses area on the storage medium that would otherwise be used to store user data. Hence, there is a balance between stronger decoding and the overhead required to incorporate the stronger encoding. This balance in some cases results in excess overhead, and in other cases uncorrectable errors.

Hence, for at least the aforementioned reasons, there exists a need in the art for advanced systems and methods for data processing.

SUMMARY

Systems and method relating generally to improving usage of storage area on a disk drive, and more particularly to systems and methods for applying encoding based upon the nature of a particular region of a disk platter on the disk drive.

Some embodiments of the present invention provide data processing systems that include a data write circuit. The data write circuit is operable to: receive a write request including a write data set and a write address; select an encoding level based at least in part on a quality of a region of a disk platter corresponding to the write address, where the disk platter includes at least a first region of a first quality and a second region of a second quality; and encode the write data set at the encoding level to yield an encoded output.

This summary provides only a general outline of some embodiments of the invention. The phrases "in one embodiment," "according to one embodiment," in various embodiments", in one or more embodiments", in "particular embodiments" and the like generally mean the particular feature, structure, or characteristic following the phrase is included in at least one embodiment of the present invention, and may be included in more than one embodiment of the present invention. Importantly, such phases do not necessarily refer to the same embodiment. Many other embodiments of the invention will become more fully apparent from the following detailed description, the appended claims and the accompanying drawings.

BRIEF DESCRIPTION OF THE FIGURES

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

FIG. 2$b$ shows a magnetic storage medium having areas exhibiting high error rates, medium error rates, and low error rates that are simplified to occur on radial boundaries in accordance with different embodiments of the present invention;

FIG. 5$b$ is a flow diagram showing a method in accordance with some embodiments of the present invention for encoding data based upon a characteristic of a region on the storage medium;

FIG. 5$c$ is a flow diagram showing a method in accordance with some embodiments of the present invention for decoding data based upon a characteristic of a region on the storage medium;

FIG. 5$d$ is a flow diagram showing a method in accordance with other embodiments of the present invention for decoding data based upon a characteristic of a region on the storage medium.

DETAILED DESCRIPTION OF SOME EMBODIMENTS

Systems and method relating generally to improving usage of storage area on a disk drive, and more particularly to systems and methods for applying encoding based upon the nature of a particular region of a disk platter on the disk drive.

Figure 1:
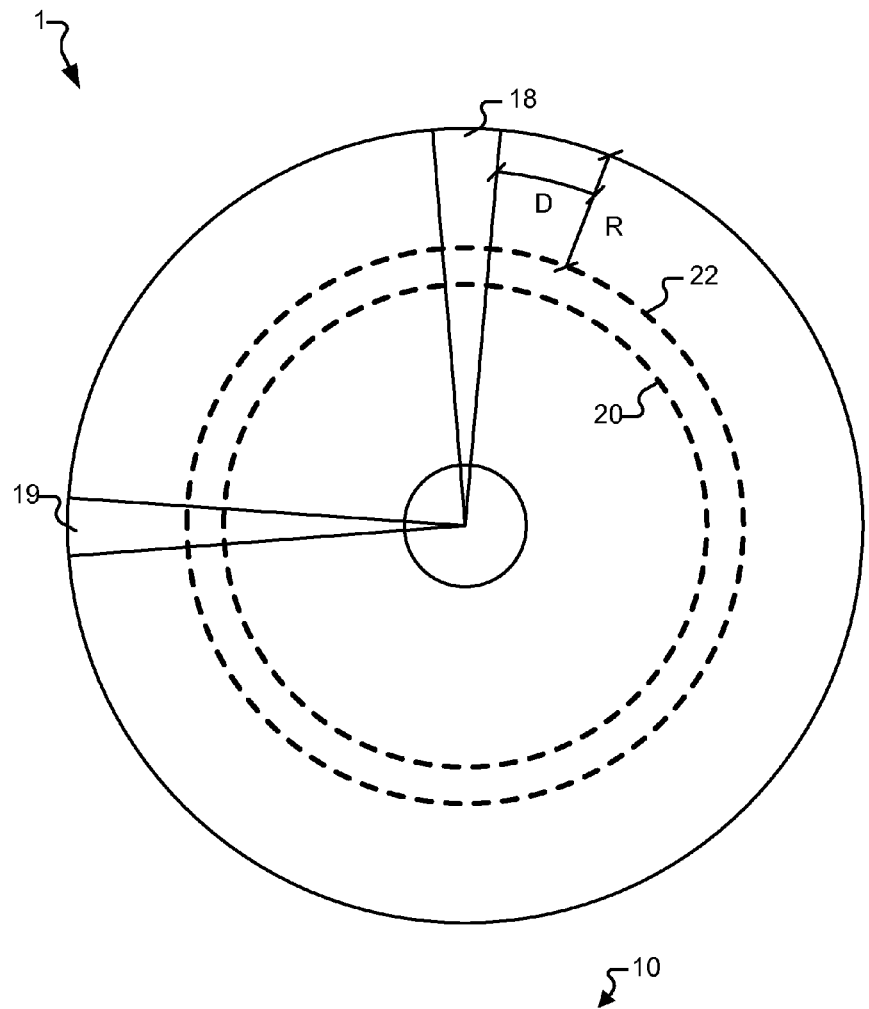
FIG. 1 is a block diagram of a known magnetic storage medium and sector data scheme.
Figure 1:
Figure 1:
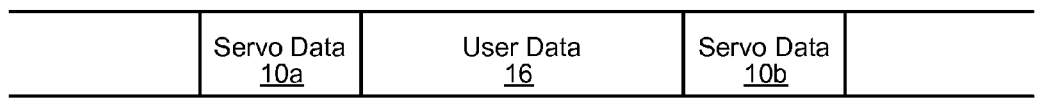

Turning to FIG. 1, a storage medium 1 is shown with two exemplary tracks 20, 22 indicated as dashed lines. The tracks are divided into sectors by servo data written within wedges 19, 18. These wedges include servo data 10 that are used for control and synchronization of a read/write head assembly over a desired location on storage medium 1. In particular, this servo data generally includes a preamble pattern 11 followed by a sector address mark 12 (SAM). Sector address mark 12 may include wedge identification information followed by the SAM. Sector address mark 12 is followed by a Gray code 13, and Gray code 13 is followed by burst information 14. Gray code 13 may include track identification information. It should be noted that while two tracks and two wedges are shown, hundreds of each would typically be included on a given storage medium. Further, it should be noted that a servo data set may have two or more fields of burst information. Yet further, it should be noted that different information may be included in the servo fields such as, for example, repeatable run-out information that may appear after burst information 14. Between the servo data bit patterns 10a and 10b, a user data region 16 is provided.

In operation, storage medium 1 is rotated in relation to a sensor that senses information from the storage medium. In a read operation, the sensor would sense servo data from wedge 19 (i.e., during a servo data period) followed by user data from a user data region between wedge 19 and wedge 18 (i.e., during a user data period) and then servo data from wedge 18. In a write operation, the sensor would sense servo data from wedge 19 then write data to the user data region between wedge 19 and wedge 18. Then, the sensor would be switched to sense a remaining portion of the user data region followed by the servo data from wedge 18. Of note, wedges 18, 19 follow arcs corresponding to the geometry of an arm and pivot as is known in the art.

Various embodiments of the present invention provide servo data processing systems capable of processing multi-rate Gray code data. Such multi-rate Gray code data may be referred to herein as either multi-rate or multi-format. As one example, the multi-rate Gray code data may include a first number of elements represented by high rate encoded codewords, and a second number of elements represented by low rate encoded codewords. In one particular embodiment of the present invention, low rate codewords are encoded such that a '111000' represents a bit value of zero, and a '000111' represents a bit value of one; and high rate codewords are encoded such that a '1100' represents a bit value of zero, and a '0011' represents a bit value of one.

Various embodiments of the present invention provide hard disk drives that include: a disk platter, a head assembly, and a read channel circuit. The disk platter includes a first region exhibiting a first quality and a second region exhibiting a second quality. The head assembly is disposed in relation to the disk platter and is operable to: write a data set to the disk platter; and provide a sensed signal corresponding to information on the storage. The read channel circuit includes a data write circuit and a data read circuit. The data write circuit is operable to: receive a write request including a write data set and a write address; determine that the write address corresponds to the first region; select an encoding level based at least in part on the first quality of the first region; encode the write data set at the encoding level to yield an encoded output; and provide the encoded output to the head assembly to be written as the data set. The data read circuit is operable to: receive a read request including a read address; receive the information from the disk platter, where the information is accessed from a location on the disk platter corresponding to the read address; determine that the read address corresponds to the second region; select a processing level based at least in part on the second quality of the second region; and apply a processing algorithm to the information, where the processing algorithm is selected based upon the processing level to recover a read data set from the information.

In some instances of the aforementioned embodiments, the hard disk drive further includes a map table indicating a location of the first region and a location of the second region. In some cases, the hard disk drive further includes a disk platter characterization circuit operable to: write a data set to the disk platter; repeatedly read the data set from the disk platter; and determine a first error rate for the first region and an error rate of the second region based upon processing of the data set repeatedly read from the disk platter. The error rate of the first region corresponds to the first quality, and the error rate of the second region corresponds to the second quality. In one or more instances of the aforementioned embodiments, the data write circuit is further operable to: resolve the write address to a physical location on the disk platter; and select the encoding level based on a comparison of the physical location and information from the map table; and the data read circuit is further operable to: resolve the read address to a physical location on the disk platter; select the processing level based on a comparison of the physical location and information from the map table.

Some embodiments of the present invention provide data processing systems that include a data write circuit. The data write circuit is operable to: receive a write request including a write data set and a write address; select an encoding level based at least in part on a quality of a region of a disk platter corresponding to the write address, where the disk platter includes at least a first region of a first quality and a second region of a second quality; and encode the write data set at the encoding level to yield an encoded output. In some instances of the aforementioned embodiment, the systems further include a map table indicating a location of the first region and a location of the second region. In some cases, the system further includes a disk platter characterization circuit. The disk platter characterization circuit is operable to: write a data set to the disk platter; repeatedly read the data set from the disk platter; and determine a first error rate for the first region and an error rate of the second region based upon processing of the data set repeatedly read from the disk platter. The error rate of the first region corresponds to the first quality, and the error rate of the second region corresponds to the second quality. In one or more cases, the data write circuit is further operable to: resolve the write address to a physical location on the disk platter; and select the encoding level based on a comparison of the physical location and information from the map table.

In some instances of the aforementioned embodiments, the systems further include a data read circuit. The data read circuit is operable to: receive a read request including a read address; access information from the disk platter at a location corresponding to the read address; select a processing level based at least in part on a quality of a region of the disk platter corresponding to the read address; and apply a processing algorithm to the information, wherein the processing algorithm is selected based upon the processing level to recover a read data set from the information. In some cases, the data read circuit is further operable to: resolve the read address to a physical location on the disk platter; and select the processing level based on a comparison of the physical location and information from the map table. In some cases, the data read circuit includes a variable format data decoder circuit. In such cases, applying the processing algorithm to the information includes applying a data decode algorithm selected based upon the processing level by the variable format data decoder circuit. In other cases, the data read circuit includes a data decoder circuit operable to apply a data decode algorithm to a decoder input derived from the information to yield a decoded output, and a data output modifying circuit operable to remove parity from the decoded output at locations indicated by the processing level. In such cases, applying the processing algorithm to the information includes removing parity from the decoded output at locations indicated by the processing level.

Figure 2A:
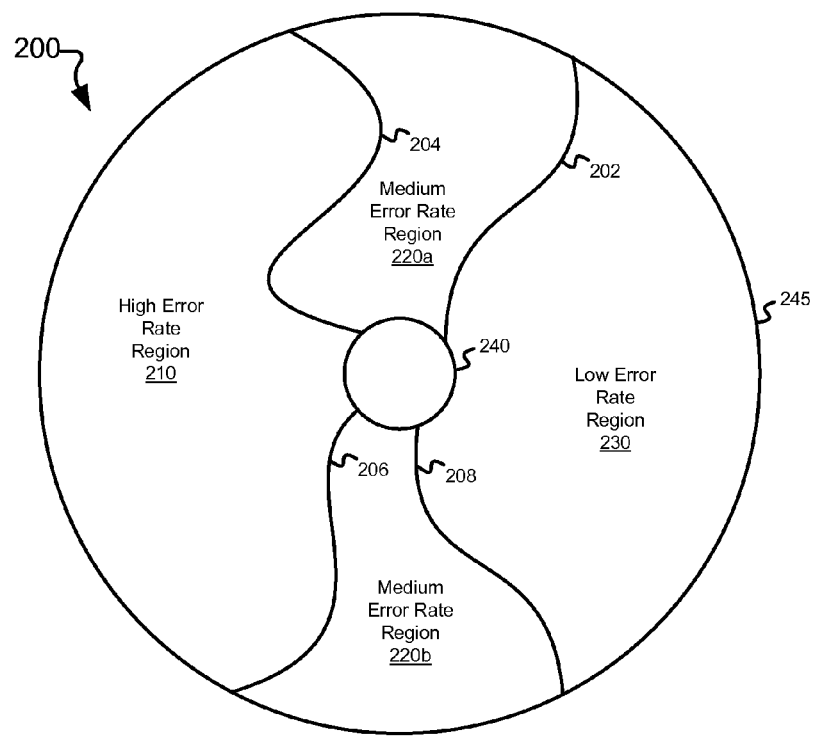
FIG. 2$a$ shows a magnetic storage medium having areas exhibiting high error rates, medium error rates, and low error rates in accordance with different embodiments of the present invention.

Turning to FIG. 2a, a magnetic storage medium 200 having an inner diameter 240 and an outer diameter 245. In addition, magnetic storage medium 200 includes areas exhibiting high error rates (high error rate medium 210), medium error rates (medium error rate regions 220a, 220b), and low error rates (low error rate region 230) in accordance with different embodiments of the present invention. The locations of the different regions is determined by testing magnetic storage medium 200 using a known output written to storage medium 200, and read back from storage medium 200. As data errors are identified during the read back, an error count for the corresponding area of storage medium 200 is incremented. In some cases, the write data is attenuated to purposely increase the error rates, and thus find additional points to characterize the different regions on storage medium 200. The determined error rates for many different areas of storage medium 200 are compared to threshold values. For example, the error rates may be compared with a high threshold. Where the error rates are greater than the high threshold, the particular area is considered to be a high error rate region. Where the error rates are less than or equal to the high threshold, then the error rates are compared with a low threshold. Where the error rates are greater than the low threshold, the particular area is considered to be a medium error rate region. Alternatively, where the error rates are less than or equal to the low threshold, the particular area is considered to be a low error rate region. It should be noted that while this embodiment is described as having three different levels of error rates (i.e., high, medium and low), other embodiments of the present invention may have two different levels of error rates, or four or more different levels of error rates. Of note, servo wedges distributed across storage medium may follow arcs corresponding to the geometry of an arm and pivot as is known in the art.

The different areas of storage medium 200 are gathered together to yield overall regions that exhibit similar numbers of areas. As shown, storage medium 200 includes high error rate region 210 extending from a boundary 204 to a boundary 206; medium error rate region 220a extending from boundary 204 to a boundary 202; low error rate region 230 extending from boundary 202 and a boundary 208; and medium error rate region 220b extending from boundary 208 to boundary 206. The different areas (i.e., high error rate region 210, medium error rate region 220a, medium error rate 220b, and low error rate region 230) are reduced to a map that can be maintained in a table. Using the map allows for determining what type of encoding that is to be used based upon an address associated with a read request or a write request.

Figure 2B:
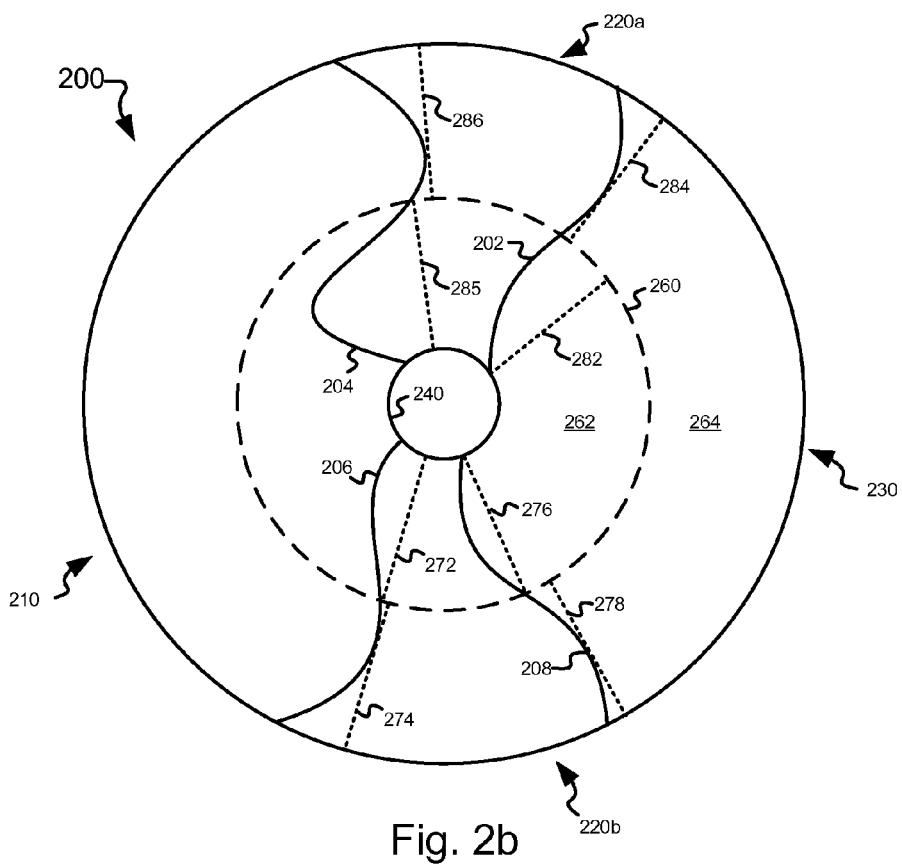

Of note, boundaries 202, 204, 206, 208 do not uniformly extend radially outward from inner diameter 240 to outer diameter 245. Making use of such non-uniform boundaries can require extensive mapping when compared with more uniform boundaries. As shown in FIG. 2b, mapping of the error rate regions may be rendered less complex by splitting storage medium into one of more regions defined by one or more region separators 260 defining one or more inner regions 262 and/or outer regions 264. Within the regions defined by region separator 260, boundaries 202, 204, 206, 208 are replaced by radial boundaries. In particular, boundary 202 is replaced by a radial boundary 282 and a radial boundary 284. Radial boundary 282 extends from inner diameter 240 to region boundary 260. Of note, radial boundary 282 extends radially outward such that every area included in medium error rate region 220a plus some of low error rate region 230 are designated as medium error rate region 220a. Assuring that all portions of medium rate region 220a and a portion of low error rate region 230 are incorporated into medium error rate region 220a, encoding applied to data written to the area will be encoded using an encoding strength sufficient to address at least the medium error rate. Similarly, radial boundary 284 extends radially outward such that every area included in medium error rate region 220a plus some of low error rate region 230 are designated as medium error rate region 220a. Boundary 204 is replaced by a radial boundary 285 and a radial boundary 286. Radial boundary 285 extends radially outward such that every area included in high error rate region 210 plus some of medium error rate region 220a are designated as high error rate region 210. Assuring that all portions of high error rate region 210 and a portion of medium error rate region 220a are incorporated into high error rate region 210, encoding applied to data written to the area will be encoded using an encoding strength sufficient to address at least the high error rate. Similarly, radial boundary 286 extends radially outward such that every area included in high error rate region 210 plus some of medium error rate region 220a are designated as high error rate region 210. Boundary 204 is replaced by a radial boundary 285 and a radial boundary 286. Radial boundary 284 extends radially outward such that every area included in high error rate region 210 plus some of medium error rate region 220a are designated as high error rate region 210; and radial boundary 286 extends radially outward such that every area included in high error rate region 210 plus some of medium error rate region 220a are designated as high error rate region 210. Boundary 206 is replaced by a radial boundary 272 and radial boundary 274. Radial boundary 272 extends radially outward such that every area included in high error rate region 210 plus some of medium error rate region 220b are designated as high error rate region 210; and radial boundary 274 extends radially outward such that every area included in high error rate region 210 plus some of medium error rate region 220b are designated as high error rate region 210. Boundary 208 is replaced by a radial boundary 276 and radial boundary 278. Radial boundary 276 extends radially outward such that every area included in medium error rate region 220b plus some of low error rate region 230 are designated as medium error rate region 220b; and radial boundary 278 extends radially outward such that every area included in medium error rate region 210 plus some of low error rate region 230 are designated as medium error rate region 220b.

After replacement of boundaries 202, 204, 206, 208 with radial boundaries 272, 274, 276, 278, 282, 284, 285, 286, the boundaries between the high, medium and low error rate regions are relatively simple radial boundaries. In particular, high error rate region 210 becomes the area within inner region 262 between radial boundary 272 and radial boundary 285, and the area within outer region 264 between radial boundary 274 and radial boundary 286. Low error rate region 230 becomes the area within inner region 262 between radial boundary 276 and radial boundary 282, and the area within outer region 264 between radial boundary 278 and radial boundary 284. Medium error rate region 220a becomes the area within inner region 262 between radial boundary 282 and radial boundary 284, and the area within outer region 264 between radial boundary 284 and radial boundary 286. Medium error rate region 220b becomes the area within inner region 262 between radial boundary 272 and radial boundary 276, and the area within outer region 264 between radial boundary 274 and radial boundary 278. The different areas (i.e., high error rate region 210, medium error rate region 220a, medium error rate 220b, and low error rate region 230) are reduced to a map that can be maintained in a table. Using the map allows for determining what type of encoding that is to be used based upon an address associated with a read request or a write request.

Figure 3:
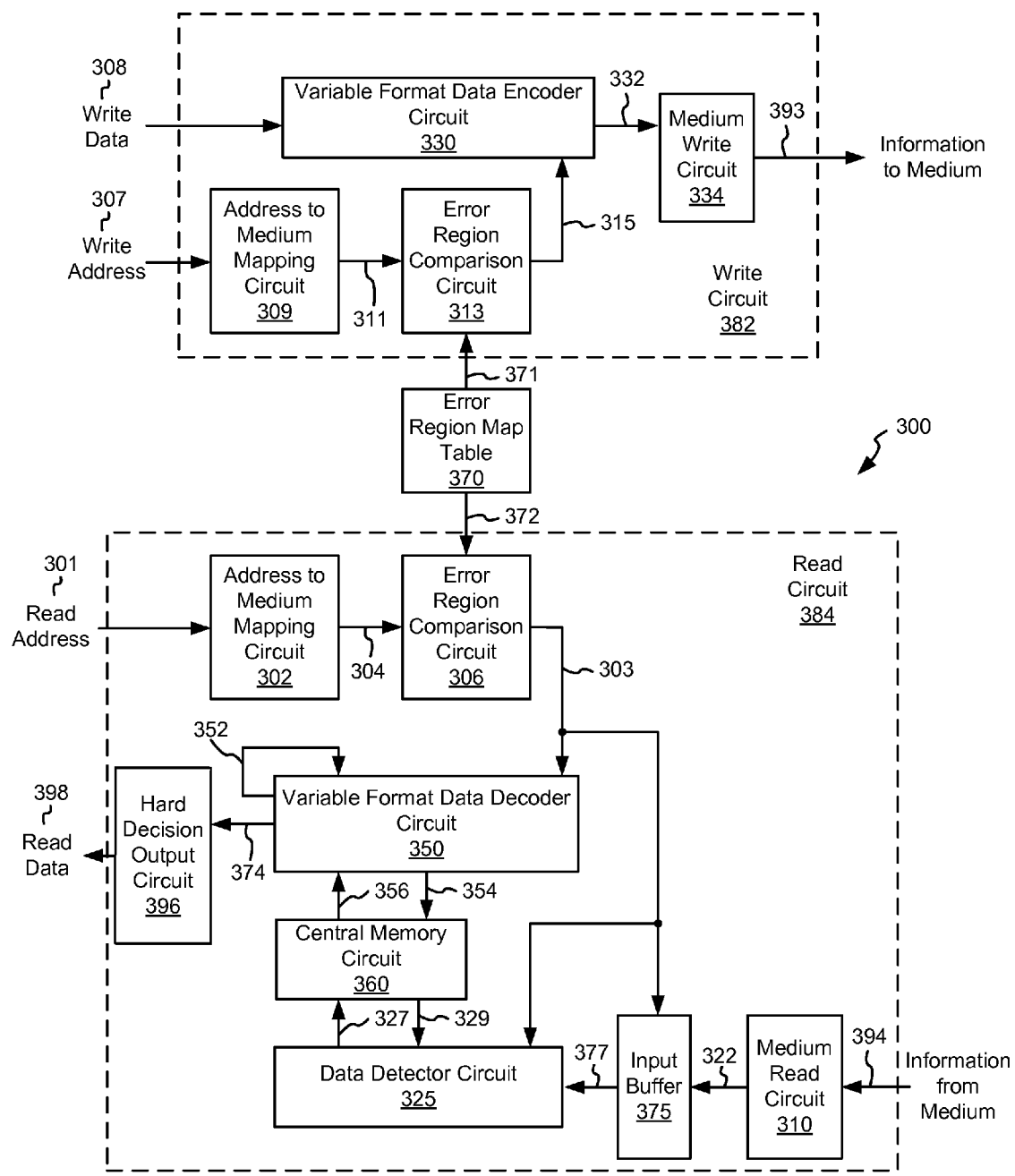
FIG. 3 depicts a read/write circuit capable of encoding and decoding data based upon a characteristic of a region from/to which the information is accessed is shown in accordance with various embodiments of the present invention.

Turning to FIG. 3, a read/write circuit 300 is shown that is capable of encoding and decoding data based upon a characteristic of a region from/to which the information is accessed. Read/write circuit 300 includes a write circuit 382, a read circuit 384, and an error region map table 370. Error region map table 370 is loaded with the location of different designated regions of a storage medium (not shown) accessed by read/write circuit 300. Using FIG. 2a as an example, error region map table 370 may indicate high error rate region 210, medium error rate region 220a, medium error rate region 220b, and low error rate region 230. These regions may be indicated by storing boundary 202, boundary 204, boundary 206, and boundary 208 with an indication of which particular regions are bounded by respective ones of the boundaries. Alternatively, using FIG. 2b as an example, error region map table 370 may similarly indicate high error rate region 210, medium error rate region 220a, medium error rate region 220b, and low error rate region 230. However, these regions may be indicated by storing radial boundaries 272, 274, 276, 278, 282, 284, 285 and 286, and region separator 260. In addition, error region map table 370 is loaded with an indication of which particular regions are bounded by respective ones of the boundaries and region separator 260. Based upon the disclosure provided herein, one of ordinary skill in the art will recognize a variety of information that may be loaded into error region map table 370 to designate distinct regions with different characteristics. Data 371 from error region map table 370 is provided to an error region comparison circuit 313.

Write circuit 382 includes an address to medium mapping circuit 309 that receives a write address 307 corresponding to received write data 308. The combination of write data 308 and write address 307 may be included in a write request received from a host device (not shown). Write address 307 is a virtual address that is converted to a physical location 311 on a storage medium (not shown) to which write data 308 is to be stored. Address to medium mapping circuit 309 may be any circuit known in the art that is capable of generating a physical location to which data is to be written (e.g., track and sector) on a storage medium based upon an address associated with a write request.

Physical location 311 is provided to error region comparison circuit 313 where it is compared to information from error region map table 370 to determine a characteristic of the storage medium at physical location 311. As an example, using FIG. 2a, the characteristic may be high error rate region, medium error rate region, or low error rate region depending upon where write data 308 is to be written on storage medium 200. The characteristic determined by comparing physical location 311 with the map of storage medium characteristics maintained in error region map table 370 is provided as a storage medium characteristic 315 to a variable format data encoder circuit 330.

Variable data encoder circuit 330 is operable to encode write data 308 using an encoding algorithm selected based upon storage medium characteristic 315. Thus, using FIG. 2a as an example, where physical location 311 corresponds to high error rate region 210, and storage medium characteristic 315 indicates encoding for a high error rate region (i.e., a stronger encoding than what would be used for either low error rate region 230 or either of medium error rate regions 220a, 220b). Based upon this, variable data encoder circuit 330 applies an encoding algorithm selected for data destined to high error rate regions of the storage medium. Alternatively, where physical location 311 corresponds to medium error rate region 220a, and storage medium characteristic 315 indicates encoding for a medium error rate region (i.e., a stronger encoding than what would be used for low error rate region 230 and weaker than that used for high error rate region 210). Based upon this, variable data encoder circuit 330 applies an encoding algorithm selected for data destined to medium error rate regions of the storage medium. Where physical location 311 corresponds to low error rate region 230, and storage medium characteristic 315 indicates encoding for a low error rate region (i.e., weaker than what would be used for either medium error rate regions 220 or high error rate region 210). Based upon this, variable data encoder circuit 330 applies an encoding algorithm selected for data destined to low error rate regions of the storage medium.

Variable data encoder circuit 330 may be any circuit capable of selectably applying two or more different encoding algorithms, with selection between the encoding algorithms based upon an error rate characteristic or other quality characteristic for a particular region on the storage medium. In some embodiments of the present invention, variable data encoder circuit 330 incorporates more parity bits per user bit in data destined for high error rate (i.e., low quality) regions of the storage medium than for data destined for either low error rate (i.e., high quality) regions or medium error rate (i.e., medium quality) regions of the storage medium; a mid level number of parity bits per user bit in data destined for medium error rate regions; and a low number of parity bits per user bit in data destined for low error rate regions than for data destined for either high error rate (i.e., low quality) regions or medium error rate (i.e., medium quality) regions of the storage medium. Again, it should be noted that while three regions are discussed, two or four or more regions may be used in relation to different embodiments of the present invention. In one particular embodiment of the present invention, variable data encoder circuit 330 is a low density parity check encoder circuit operable to encode user data to generate low density parity check codewords each with a different balance of parity to user data depending upon the region on the storage medium to which a data set is to be written.

The result of applying the selected encoding of write data 308 by variable data encoder circuit 330 is provided as an encoded output 332 to a medium write circuit 334. Medium write circuit 334 includes all circuitry needed to prepare a data set to be written to a storage medium including, but not limited to, a write pre-compensation circuit and a write head. Based upon the disclosure provided herein, one of ordinary skill in the art will recognize a variety of circuitry that may be included in medium write circuit 334 in accordance with different embodiments of the present invention. Medium write circuit 334 provides information to the medium 393.

Data written to the storage medium is eventually re-read from the storage medium as information 394 from the storage medium. Information 394 from the storage medium is provided to a medium read circuit 310 that includes all circuitry necessary to process data read from the storage medium into usable data sets. Medium read circuit 310 may include, but is not limited to, a read head, a preamplifier, a variable gain amplifier, an analog to digital converter circuit, and/or an equalizer circuit. Based upon the disclosure provided herein, one of ordinary skill in the art will recognize a variety of circuitry that may be included in medium read circuit 310 in accordance with different embodiments of the present invention. Medium read circuit 310 stores the resulting series of data 322 to an input buffer 375. Input buffer 375 includes sufficient memory to maintain one or more codewords (sets of data 322) until processing of that codeword is completed through a data detector circuit 325 and a variable format data decoder circuit 350 including, where warranted, multiple "global iterations" defined as passes through both data detector circuit 325 and variable format data decoder circuit 350 and/or "local iterations" defined as passes through data decoding circuit 350 during a given global iteration. Input buffer 375 stores the received data as buffered data 377.

Data detector circuit 325 is a data detector circuit capable of producing a detected output 327 by applying a data detection algorithm to a data input. As some examples, the data detection algorithm may be but is not limited to, a Viterbi algorithm detection algorithm or a maximum a posteriori detection algorithm as are known in the art. Based upon the disclosure provided herein, one of ordinary skill in the art will recognize a variety of data detection algorithms that may be used in relation to different embodiments of the present invention. Data detector circuit 325 may provide both hard decisions and soft decisions. The terms "hard decisions" and "soft decisions" are used in their broadest sense. In particular, "hard decisions" are outputs indicating an expected original input value (e.g., a binary '1' or '0', or a non-binary digital value), and the "soft decisions" indicate a likelihood that corresponding hard decisions are correct. Based upon the disclosure provided herein, one of ordinary skill in the art will recognize a variety of hard decisions and soft decisions that may be used in relation to different embodiments of the present invention.

Detected output 327 is provided to a central queue memory circuit 360 that operates to buffer data passed between data detector circuit 325 and variable data decoder circuit 350. When data decoder circuit 350 is available, data decoder circuit 350 receives detected output 327 from central queue memory 360 as a decoder input 356. Data decoder circuit 350 applies a data decoding algorithm to decoder input 356 in an attempt to recover originally written data. The result of the data decoding algorithm is provided as a decoded output 354. Similar to detected output 327, decoded output 354 may include both hard decisions and soft decisions. For example, data decoder circuit 350 may be any data decoder circuit known in the art that is capable of applying a decoding algorithm to a received input. Data decoder circuit 350 may be, but is not limited to, a low density parity check decoder circuit or a Reed Solomon decoder circuit as are known in the art. Based upon the disclosure provided herein, one of ordinary skill in the art will recognize a variety of data decoder circuits that may be used in relation to different embodiments of the present invention. Where the original data is recovered (i.e., the data decoding algorithm converges) or a timeout condition occurs, data decoder circuit 350 provides the result of the data decoding algorithm as a data output 374. Data output 374 is provided to a hard decision output circuit 396 where the data is reordered before providing a series of ordered data sets as a data output 398.

One or more iterations through the combination of data detector circuit 325 and variable format data decoder circuit 350 may be made in an effort to converge on the originally written data set. As mentioned above, processing through both the data detector circuit and the data decoder circuit is referred to as a "global iteration". For the first global iteration, data detector circuit 325 applies the data detection algorithm without guidance from a decoded output. For subsequent global iterations, data detector circuit 325 applies the data detection algorithm to buffered data 377 as guided by decoded output 354. Decoded output 354 is received from central queue memory 360 as a detector input 329.

During each global iteration it is possible for data decoder circuit 350 to make one or more local iterations including application of the data decoding algorithm to decoder input 356. For the first local iteration, data decoder circuit 350 applies the data decoder algorithm without guidance from a decoded output 352. For subsequent local iterations, data decoder circuit 350 applies the data decoding algorithm to decoder input 356 as guided by a previous decoded output 352. In some embodiments of the present invention, a default of ten local iterations is allowed for each global iteration.

Data decoder circuit 350 applies a data decoding algorithm selected based upon which region of a storage medium information 394 is derived. To obtain this location information, a read address 301 associated with a received read request and indicating information 394 is provided to an address to medium mapping circuit 302. Similar to address to medium mapping circuit 309, address to medium mapping circuit 302 converts the virtual address received as read address 301 to a physical location 304 on the storage medium from which information 394 is accessed. Address to medium mapping circuit 302 may be any circuit known in the art that is capable of generating a physical location to which data is to be written (e.g., track and sector) on a storage medium based upon an address associated with a read request.

Physical location 304 is provided to an error region comparison circuit 306 where it is compared to information from error region map table 370 to determine a characteristic of the storage medium at physical location 304. As an example, using FIG. 2a, the characteristic may be high error rate region, medium error rate region, or low error rate region depending upon where on storage medium 200 information 394 is to be derived. The characteristic determined by comparing physical location 304 with the map of storage medium characteristics maintained in error region map table 370 is provided as a storage medium characteristic 303 to variable format data decoder circuit 350. Where storage medium characteristic 303 indicates a high error rate region, variable format data decoder circuit 350 applies a data decoding algorithm corresponding to information accessed from such regions; where storage medium characteristic 303 indicates a medium error rate region, variable format data decoder circuit 350 applies a data decoding algorithm corresponding to information accessed from such regions; and where storage medium characteristic 303 indicates a low error rate region, variable format data decoder circuit 350 applies a data decoding algorithm corresponding to information accessed from such regions. In addition, storage medium characteristic 303 it provided to data detector circuit 325 allowing data detector circuit 325 to properly account for any changes in the modulation code, and storage medium characteristic 303 it provided to input buffer 375 to account for changes to the encoded size of the sectors stored therein.

Figure 4:
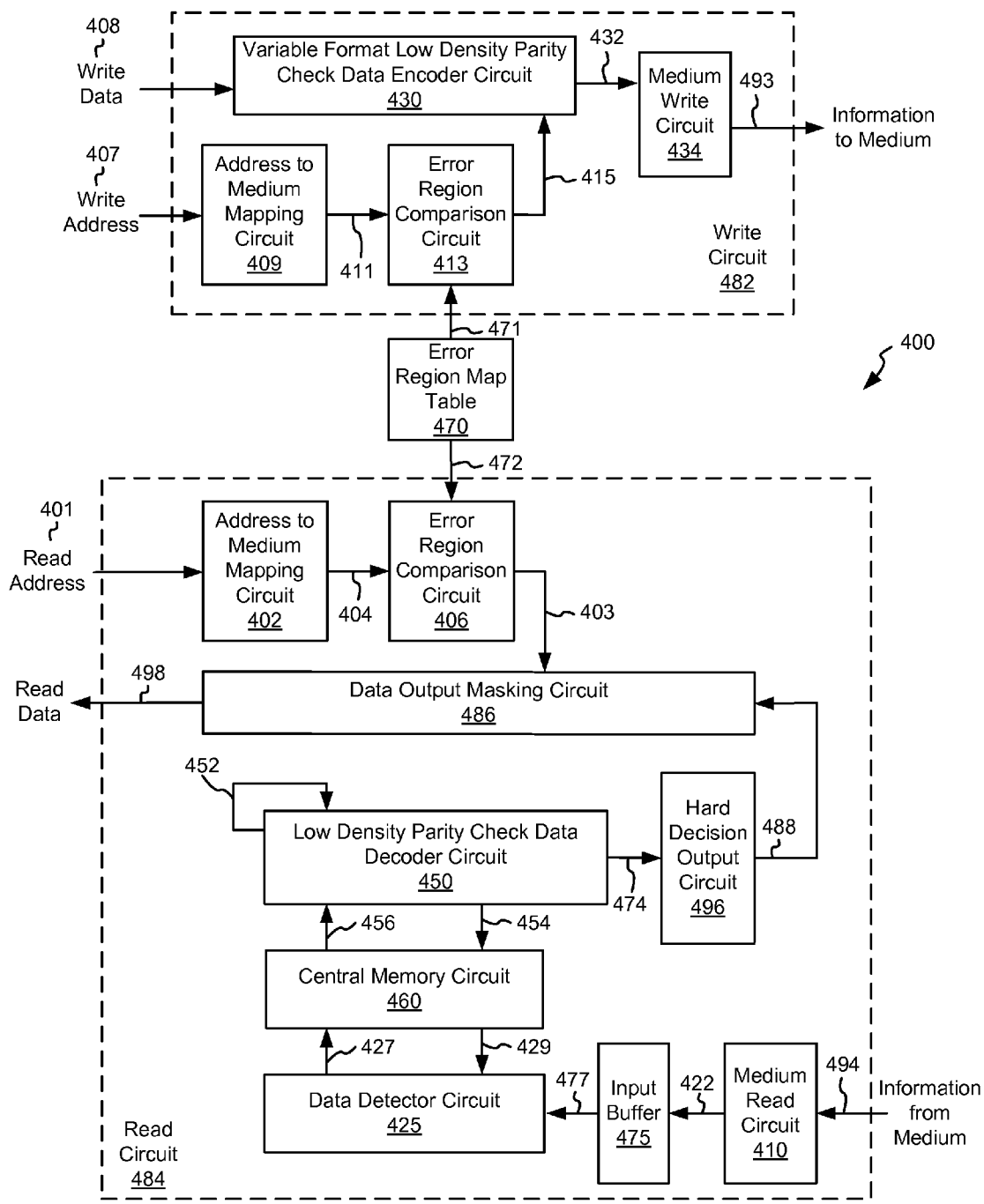
FIG. 4 depicts another read/write circuit capable of encoding and decoding data based upon a characteristic of a region from/to which the information is accessed is shown in accordance with other embodiments of the present invention.

Turning to FIG. 4, another read/write circuit 400 capable of encoding and decoding data based upon a characteristic of a region from/to which the information is accessed is shown in accordance with other embodiments of the present invention. In contrast to read/write circuit 300 discussed above in relation to FIG. 3, read/write circuit 400 includes a data decode circuit 450 that applies the same data decode algorithm regardless of the region of the storage medium from which the read data is derived.

Read/write circuit 400 includes a write circuit 482, a read circuit 484, and an error region map table 470. Error region map table 470 is loaded with the location of different designated regions of a storage medium (not shown) accessed by read/write circuit 400. Using FIG. 2a as an example, error region map table 470 may indicate high error rate region 210, medium error rate region 220*a*, medium error rate region 220*b*, and low error rate region 230. These regions may be indicated by storing boundary 202, boundary 204, boundary 206, and boundary 208 with an indication of which particular regions are bounded by respective ones of the boundaries. Alternatively, using FIG. 2*b* as an example, error region map table 470 may similarly indicate high error rate region 210, medium error rate region 220*a*, medium error rate region 220*b*, and low error rate region 230. However, these regions may be indicated by storing radial boundaries 272, 274, 276, 278, 282, 284, 285 and 286, and region separator 260. In addition, error region map table 470 is loaded with an indication of which particular regions are bounded by respective ones of the boundaries and region separator 260. Based upon the disclosure provided herein, one of ordinary skill in the art will recognize a variety of information that may be loaded into error region map table 470 to designate distinct regions with different characteristics. Data 471 from error region map table 470 is provided to an error region comparison circuit 413.

Write circuit 482 includes an address to medium mapping circuit 409 that receives a write address 407 corresponding to received write data 408. The combination of write data 408 and write address 407 may be included in a write request received from a host device (not shown). Write address 407 is a virtual address that is converted to a physical location 411 on a storage medium (not shown) to which write data 408 is to be stored. Address to medium mapping circuit 409 may be any circuit known in the art that is capable of generating a physical location to which data is to be written (e.g., track and sector) on a storage medium based upon an address associated with a write request.

Physical location 411 is provided to error region comparison circuit 413 where it is compared to information 372 from error region map table 470 to determine a characteristic of the storage medium at physical location 411. As an example, using FIG. 2*a*, the characteristic may be high error rate region, medium error rate region, or low error rate region depending upon where write data 408 is to be written on storage medium 200. The characteristic determined by comparing physical location 411 with the map of storage medium characteristics maintained in error region map table 470 is provided as a storage medium characteristic 415 to a variable format data encoder circuit 430.

Variable data encoder circuit 430 is operable to encode write data 408 using an encoding algorithm selected based upon storage medium characteristic 415. Thus, using FIG. 2*a* as an example, where physical location 411 corresponds to high error rate region 210, and storage medium characteristic 415 indicates encoding for a high error rate region (i.e., a stronger encoding than what would be used for either low error rate region 230 or either of medium error rate regions 220*a*, 220*b*). Based upon this, variable data encoder circuit 430 applies an encoding algorithm selected for data destined to high error rate regions of the storage medium. Alternatively, where physical location 411 corresponds to medium error rate region 220*a*, and storage medium characteristic 415 indicates encoding for a medium error rate region (i.e., a stronger encoding than what would be used for low error rate region 230 and weaker than that used for high error rate region 210). Based upon this, variable data encoder circuit 430 applies an encoding algorithm selected for data destined to medium error rate regions of the storage medium. Where physical location 411 corresponds to low error rate region 230, and storage medium characteristic 415 indicates encoding for a low error rate region (i.e., weaker than what would be used for either medium error rate regions 220 or high error rate region 210). Based upon this, variable data encoder circuit 430 applies an encoding algorithm selected for data destined to low error rate regions of the storage medium.

Variable data encoder circuit 430 may be any circuit capable of selectably applying two or more different encoding algorithms, with selection between the encoding algorithms based upon an error rate characteristic or other quality characteristic for a particular region on the storage medium. In some embodiments of the present invention, variable data encoder circuit 430 incorporates more parity bits per user bit in data destined for high error rate (i.e., low quality) regions of the storage medium than for data destined for either low error rate (i.e., high quality) regions or medium error rate (i.e., medium quality) regions of the storage medium; a mid level number of parity bits per user bit in data destined for medium error rate regions; and a low number of parity bits per user bit in data destined for low error rate regions than for data destined for either high error rate (i.e., low quality) regions or medium error rate (i.e., medium quality) regions of the storage medium. Again, it should be noted that while three regions are discussed, two or four or more regions may be used in relation to different embodiments of the present invention. In ne particular embodiment of the present invention, variable data encoder circuit 430 is a low density parity check encoder circuit operable to encode user data to generate low density parity check codewords each with a different balance of parity to user data depending upon the region on the storage medium to which a data set is to be written.

The result of applying the selected encoding of write data 408 by variable data encoder circuit 430 is provided as an encoded output 432 to a medium write circuit 434. Medium write circuit 434 includes all circuitry needed to prepare a data set to be written to a storage medium including, but not limited to, a write pre-compensation circuit and a write head. Based upon the disclosure provided herein, one of ordinary skill in the art will recognize a variety of circuitry that may be included in medium write circuit 434 in accordance with different embodiments of the present invention. Medium write circuit 434 provides information to the medium 493.

Data written to the storage medium is eventually re-read from the storage medium as information 494 from the storage medium. Information 494 from the storage medium is provided to a medium read circuit 410 that includes all circuitry necessary to process data read from the storage medium into usable data sets. Medium read circuit 410 may include, but is not limited to, a read head, a preamplifier, a variable gain amplifier, an analog to digital converter circuit, and/or an equalizer circuit. Based upon the disclosure provided herein, one of ordinary skill in the art will recognize a variety of circuitry that may be included in medium read circuit 410 in accordance with different embodiments of the present invention. Medium read circuit 410 stores the resulting series of data 422 to an input buffer 475. Input buffer 475 includes sufficient memory to maintain one or more codewords (sets of data 422) until processing of that codeword is completed through a data detector circuit 425 and a low density parity check data decoder circuit 450 including, where warranted, multiple "global iterations" defined as passes through both data detector circuit 425 and low density parity check data decoder circuit 450 and/or "local iterations" defined as passes through data decoding circuit 450 during a given global iteration. Input buffer 475 stores the received data as buffered data 477.

Data detector circuit 425 is a data detector circuit capable of producing a detected output 427 by applying a data detection algorithm to a data input. As some examples, the data detection algorithm may be but is not limited to, a Viterbi algorithm detection algorithm or a maximum a posteriori detection algorithm as are known in the art. Based upon the disclosure provided herein, one of ordinary skill in the art will recognize a variety of data detection algorithms that may be used in relation to different embodiments of the present invention. Data detector circuit 425 may provide both hard decisions and soft decisions. The terms "hard decisions" and "soft decisions" are used in their broadest sense. In particular, "hard decisions" are outputs indicating an expected original input value (e.g., a binary '1' or '0', or a non-binary digital value), and the "soft decisions" indicate a likelihood that corresponding hard decisions are correct. Based upon the disclosure provided herein, one of ordinary skill in the art will recognize a variety of hard decisions and soft decisions that may be used in relation to different embodiments of the present invention.

Detected output 427 is provided to a central queue memory circuit 460 that operates to buffer data passed between data detector circuit 425 and low density parity check data decoder circuit 450. When low density parity check data decoder circuit 450 is available, low density parity check data decoder circuit 450 receives detected output 427 from central queue memory 460 as a decoder input 456. Low density parity check data decoder circuit 450 applies a data decoding algorithm to decoder input 456 in an attempt to recover originally written data. The result of the data decoding algorithm is provided as a decoded output 454. Similar to detected output 427, decoded output 454 may include both hard decisions and soft decisions. For example, low density parity check data decoder circuit 450 may be any low density parity check decoder circuit known in the art. Where the original data is recovered (i.e., the data decoding algorithm converges) or a timeout condition occurs, low density parity check data decoder circuit 450 provides the result of the data decoding algorithm as a data output 474. Data output 474 is provided to a hard decision output circuit 496 where the data is reordered before providing a series of ordered data sets as a data output 488.

One or more iterations through the combination of data detector circuit 425 and low density parity check data decoder circuit 450 may be made in an effort to converge on the originally written data set. As mentioned above, processing through both the data detector circuit and the data decoder circuit is referred to as a "global iteration". For the first global iteration, data detector circuit 425 applies the data detection algorithm without guidance from a decoded output. For subsequent global iterations, data detector circuit 425 applies the data detection algorithm to buffered data 477 as guided by decoded output 454. Decoded output 454 is received from central queue memory 460 as a detector input 429.

During each global iteration it is possible for low density parity check data decoder circuit 450 to make one or more local iterations including application of the data decoding algorithm to decoder input 456. For the first local iteration, low density parity check data decoder circuit 450 applies the data decoder algorithm without guidance from a decoded output 452. For subsequent local iterations, low density parity check data decoder circuit 450 applies the data decoding algorithm to decoder input 456 as guided by a previous decoded output 452. In some embodiments of the present invention, a default of ten local iterations is allowed for each global iteration.

Low density parity check data decoder circuit 450 applies a low density parity check decode algorithm regardless of which region of a storage medium information 494 is derived. Rather, after a codeword converges and is provided as data output 474 from low density parity check data decoder circuit 450, the resulting data output 488 is provided to a data output masking circuit 486. Data output masking circuit 486 removes the parity bits from data output 488 based upon the physical location on the storage medium from which information 494 was derived. The parity reduced data output is provided as read data 498.

To obtain the location from which information 494 was derived and therefore the selection of where parity is to be removed from data output 488, a read address 401 associated with a received read request and indicating information 494 is provided to an address to medium mapping circuit 402. Similar to address to medium mapping circuit 409, address to medium mapping circuit 402 converts the virtual address received as read address 401 to a physical location 404 on the storage medium from which information 494 is accessed. Address to medium mapping circuit 402 may be any circuit known in the art that is capable of generating a physical location to which data is to be written (e.g., track and sector) on a storage medium based upon an address associated with a read request.

Physical location 404 is provided to an error region comparison circuit 406 where it is compared to information 472 from error region map table 470 to determine a characteristic of the storage medium at physical location 404. As an example, using FIG. 2a, the characteristic may be high error rate region, medium error rate region, or low error rate region depending upon where on storage medium 200 information 494 is to be derived. The characteristic determined by comparing physical location 404 with the map of storage medium characteristics maintained in error region map table 470 is provided as a storage medium characteristic 403 to data output masking circuit 486. Where storage medium characteristic 403 indicates a high error rate region, data output masking circuit 486 removes parity data corresponding to information accessed from such regions; where storage medium characteristic 403 indicates a medium error rate region, data output masking circuit 486 removes parity data corresponding to information accessed from such regions; and where storage medium characteristic 403 indicates a low error rate region, data output masking circuit 486 removes parity data corresponding to information accessed from such regions.

Figure 5A:
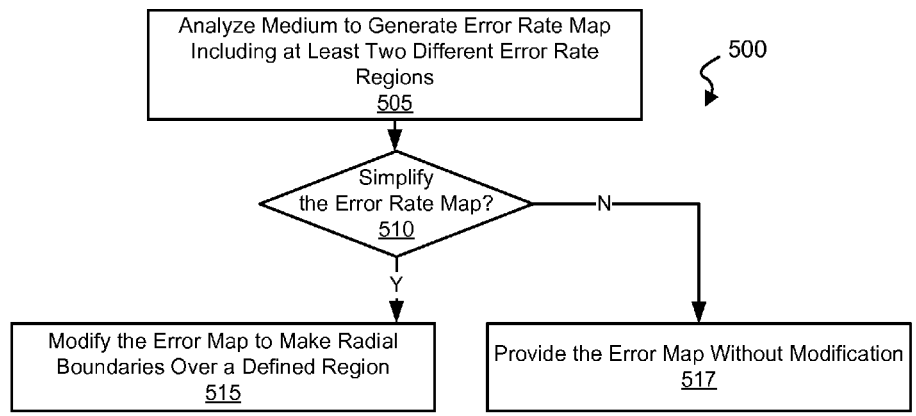
FIG. 5$a$ is a flow diagram showing a method in accordance with some embodiments of the present invention for generating an error rate map for a storage medium.

Turning to FIG. 5a, a flow diagram 500 shows a method in accordance with some embodiments of the present invention for generating an error rate map for a storage medium. Following flow diagram 500, a medium is analyzed to generate an error rate map including at least two different error rate regions (block 505). The analysis may be done by repeatedly writing data to a storage medium and reading the data back from the storage medium. The data read back from the storage medium and a number of errors occurring in the processing is noted for each location on the storage medium. In some cases, the write data or the read back data is attenuated to purposely increase the error rates, and thus find additional points to characterize the different regions on the storage medium. The determined error rates for many different areas of the storage medium are compared to threshold values. For example, the error rates may be compared with a high threshold. Where the error rates are greater than the high threshold, the particular area is considered to be a high error rate region. Where the error rates are less than or equal to the high threshold, then the error rates are compared with a low threshold. Where the error rates are greater than the low threshold, the particular area is considered to be a medium error rate region. Alternatively, where the error rates are less than or equal to the low threshold, the particular area is considered to be a low error rate region. It should be noted that while this embodiment is described as having three different levels of error rates (i.e., high, medium and low), other embodiments of the present invention may have two different levels of error rates, or four or more different levels of error rates. Such an approach results in an error rate map similar to that discussed above in relation to FIG. 2a.

The boundaries generated by the process of block 505 may be complicated and require substantial data to map. In some cases to reduce this complexity, it is desired to simplify the error rate map (block 510). Where simplification is desired (block 510), the boundaries defined in block 505 are replaced by simpler radial boundaries extending between defined circumferences on the storage medium (block 515). This may be done similar to that described above in relation to FIG. 2b. Alternatively, where no simplification is desired (block 510), the error map generated as part of block 505 is provided without modification (block 517).

Figure 5B:
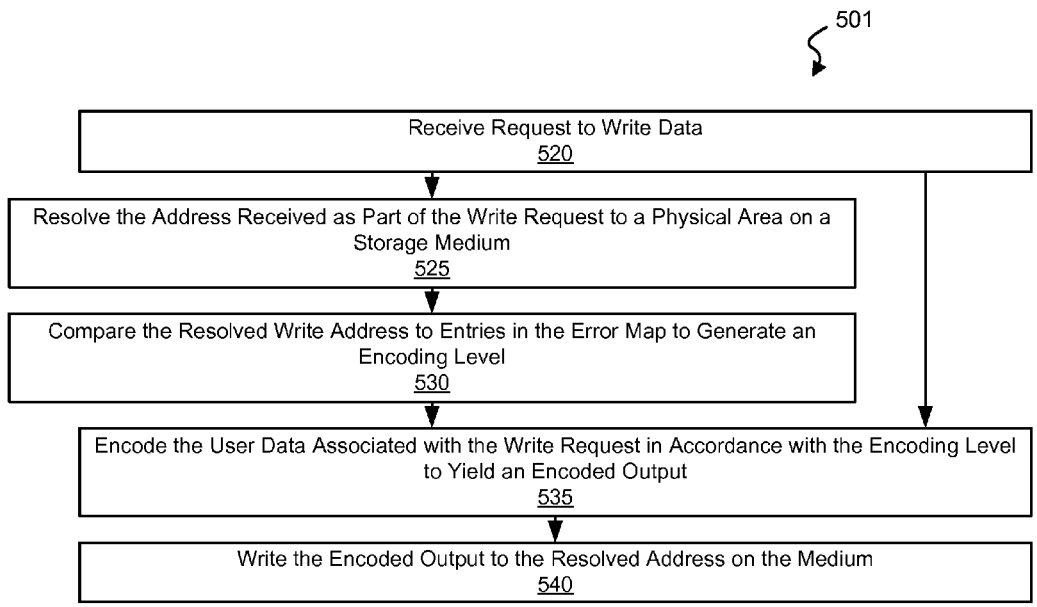

Turning to FIG. 5b, a flow diagram 501 shows a method in accordance with some embodiments of the present invention for encoding data based upon a characteristic of a region on the storage medium. Following flow diagram 501, a request to write data is received (block 520). This request includes user data to be written to a storage medium, and a virtual address of a location on the storage medium to which the data is to be written. The address received as part of the write request is resolved from the virtual address space to a physical area on the storage medium (block 525). The resolved address is then compared with entries in the error map generated above in flow diagram 500 to determine an encoding level (block 530). The determined encoding level is an encoding level selected to provide sufficiently strong encoding (i.e., a sufficient number of encoding bits) for the quality of the medium at the location of the physical area to which the data is to be written, and sufficiently weak to avoid wasting area storing an excessive number of encoding bits. The write data is then encoded using the determined encoding level to yield an encoded output (block 535). This encoded output is then prepared and written to the physical area on the storage medium identified by the earlier resolved write address (block 540).

Figure 5C:
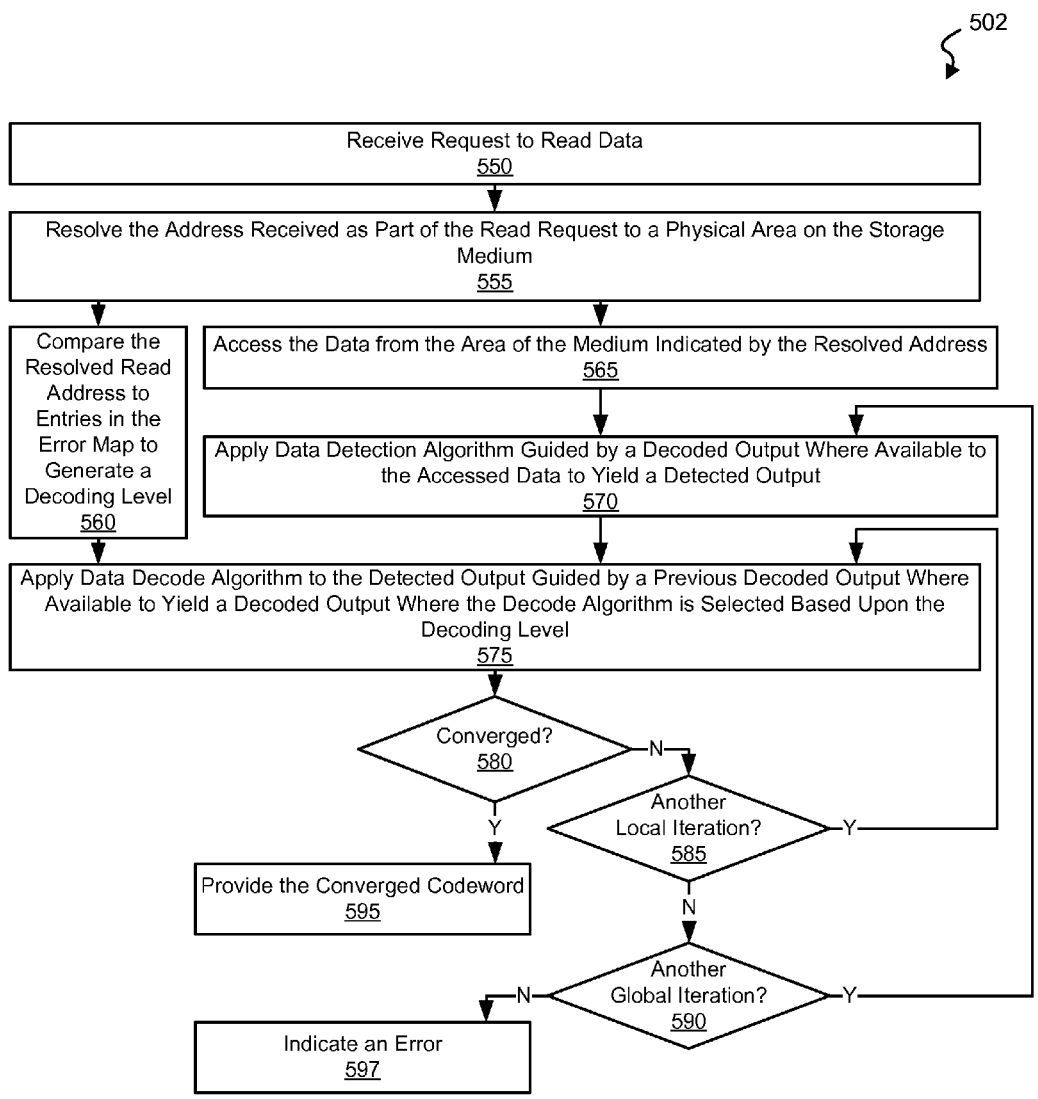

Turning to FIG. 5c, a flow diagram 502 shows a method in accordance with some embodiments of the present invention for decoding data based upon a characteristic of a region on the storage medium. Following flow diagram 502, a request to read data from the storage medium is received (block 550). This request includes a virtual address indicating a location on the storage medium from where the requested data can be obtained. The address received as part of the read request is resolved from the virtual address space to a physical area on the storage medium (block 555). The resolved address is then compared with entries in the error map generated above in flow diagram 500 to determine an encoding level (block 560). The determined encoding level is an encoding level selected to provide sufficiently strong encoding (i.e., a sufficient number of encoding bits) for the quality of the medium at the location of the physical area to which the data is to be written, and sufficiently weak to avoid wasting area storing an excessive number of encoding bits.

In addition, the physical area on the storage medium indicated by the read request is accessed to obtain the read data (block 565). A data detection algorithm is applied to the accessed data to yield a detected output (block 570). Where application of the data detection algorithm is part of a second or later global iteration, application of the data detection algorithm is guided by a decoded output corresponding to the accessed data. A data decode algorithm is then applied to the detected output, with the data decode algorithm being selected based upon the level of encoding determined in block 560 (block 575).

It is determined whether the decoded output converged (i.e., resulted in the original data set indicated by no remaining errors in the decoding process) (block 580). Where the decoded output converged (block 580), the decoded output is provided as a converged codeword to a requesting device (block 595). Otherwise, where it is determined that the decode output failed to converge (block 580), it is determined whether another local iteration is allowed (block 585). Where another local iteration is allowed (block 585), the processes starting at block 575 are repeated. Alternatively, where no additional local iterations are allowed (block 585), it is determined whether another global iteration is allowed (block 590). Where another global iteration is allowed (block 590), the processes starting at block 570 are repeated. Otherwise, an error is indicated (block 597).

Figure 5D:
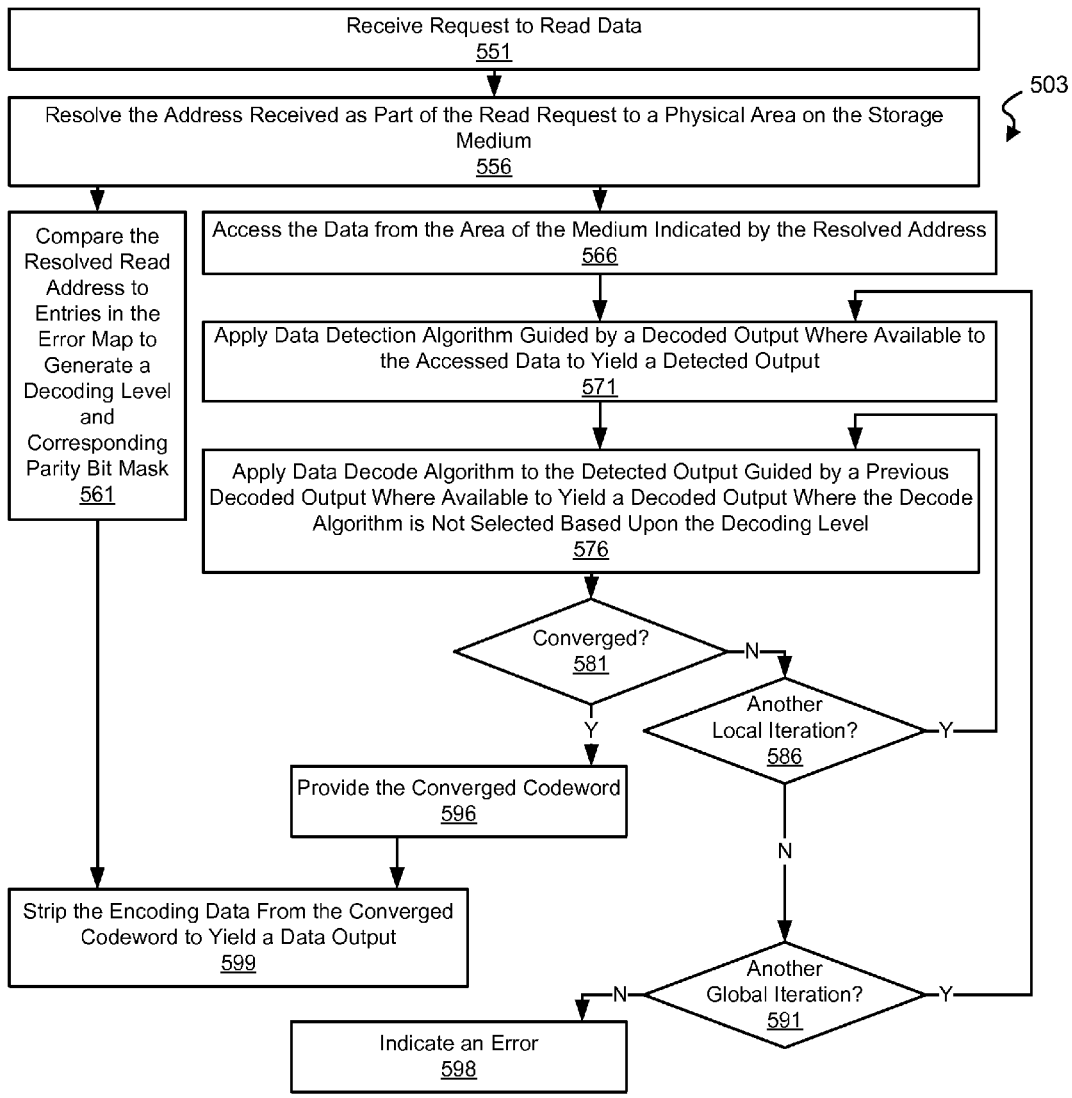

Turning to FIG. 5d, a flow diagram 503 shows another method in accordance with other embodiments of the present invention for decoding data based upon a characteristic of a region on the storage medium. Following flow diagram 503, a request to read data from the storage medium is received (block 551). This request includes a virtual address indicating a location on the storage medium from where the requested data can be obtained. The address received as part of the read request is resolved from the virtual address space to a physical area on the storage medium (block 556). The resolved address is then compared with entries in the error map generated above in flow diagram 500 to determine an encoding level (block 561). The determined encoding level is an encoding level selected to provide sufficiently strong encoding (i.e., a sufficient number of encoding bits) for the quality of the medium at the location of the physical area to which the data is to be written, and sufficiently weak to avoid wasting area storing an excessive number of encoding bits.

In addition, the physical area on the storage medium indicated by the read request is accessed to obtain the read data (block 566). A data detection algorithm is applied to the accessed data to yield a detected output (block 571). Where application of the data detection algorithm is part of a second or later global iteration, application of the data detection algorithm is guided by a decoded output corresponding to the accessed data. A data decode algorithm is then applied to the detected output, with the data decode algorithm being the same regardless of the encoding level applied during flow diagram 501 (block 576).

It is determined whether the decoded output converged (i.e., resulted in the original data set indicated by no remaining errors in the decoding process) (block 581). Where the decoded output converged (block 581), the decoded output is provided as a converged codeword (block 596). Parity data is then stripped from the converged codeword to yield a data output (block 599). The parity data is stripped from locations indicated by a parity bit mask that corresponds to the decoding level determined in block 561. For example, where a strong encoding level was selected, the parity bit mask will indicate the locations of more parity bits in the converged codeword than where a weak encoding level was selected.

Otherwise, where it is determined that the decode output failed to converge (block 581), it is determined whether another local iteration is allowed (block 586). Where another local iteration is allowed (block 586), the processes starting at block 576 are repeated. Alternatively, where no additional local iterations are allowed (block 586), it is determined whether another global iteration is allowed (block 591). Where another global iteration is allowed (block 591), the processes starting at block 571 are repeated. Otherwise, an error is indicated (block 598).

Figure 6:
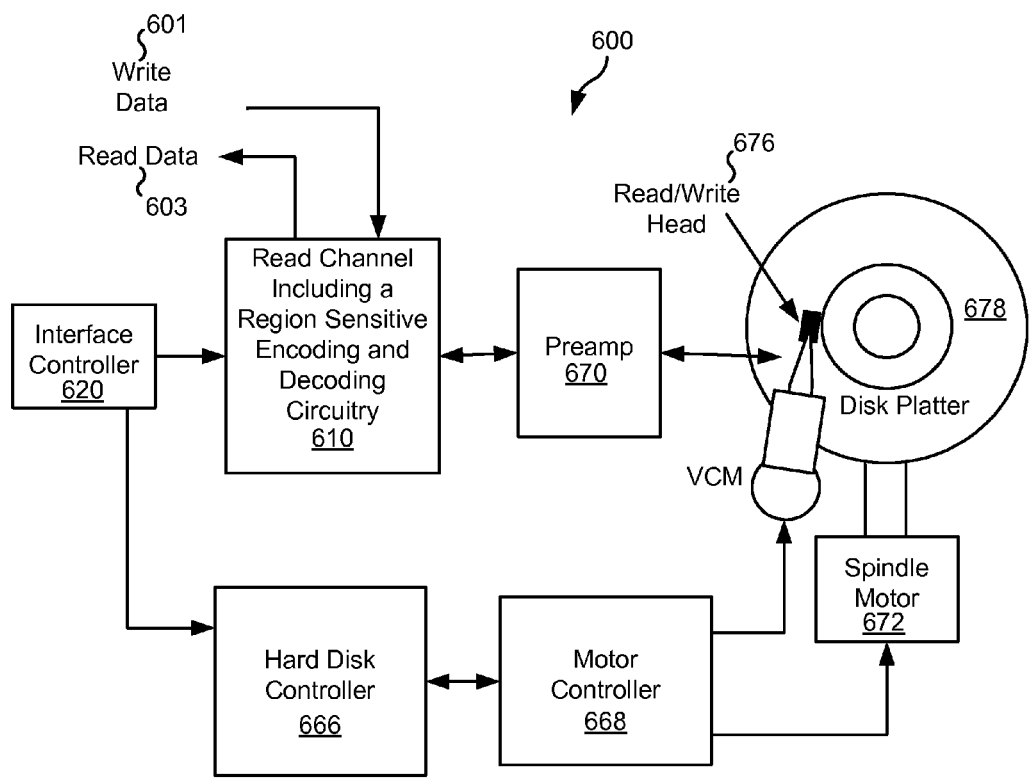
FIG. 6 shows a storage system including region sensitive encoding and decoding circuitry in accordance with various embodiments of the present invention.

Turning to FIG. 6, a storage system 600 is shown that includes region sensitive encoding and decoding circuitry in accordance with various embodiments of the present invention. Storage system 600 may be, for example, a hard disk drive. Storage system 600 also includes a preamplifier 670, an interface controller 620, a hard disk controller 666, a motor controller 668, a spindle motor 672, a disk platter 678, and a read/write head 676. Interface controller 620 controls addressing and timing of data to/from disk platter 678, and interacts with a host controller 690. The data on disk platter 678 consists of groups of magnetic signals that may be detected by read/write head assembly 676 when the assembly is properly positioned over disk platter 678. In one embodiment, disk platter 678 includes magnetic signals recorded in accordance with either a longitudinal or a perpendicular recording scheme.

In a typical read operation, read/write head assembly 676 is accurately positioned by motor controller 668 over a desired data track on disk platter 678. Motor controller 668 both positions read/write head assembly 676 in relation to disk platter 678 and drives spindle motor 672 by moving read/write head assembly to the proper data track on disk platter 678 under the direction of hard disk controller 666. Spindle motor 672 spins disk platter 678 at a determined spin rate (RPMs). Once read/write head assembly 676 is positioned adjacent the proper data track, magnetic signals representing data on disk platter 678 are sensed by read/write head assembly 676 as disk platter 678 is rotated by spindle motor 672. The sensed magnetic signals are provided as a continuous, minute analog signal representative of the magnetic data on disk platter 678. This minute analog signal is transferred from read/write head assembly 676 to read channel circuit 610 via preamplifier 670. Preamplifier 670 is operable to amplify the minute analog signals accessed from disk platter 678. In turn, read channel circuit 610 decodes and digitizes the received analog signal to recreate the information originally written to disk platter 678. This data is provided as read data 603 to a receiving circuit. A write operation is substantially the opposite of the preceding read operation with write data 601 being provided to read channel circuit 610. This data is then encoded and written to disk platter 678.

As part of accessing data from disk platter 678 during a write operation, it is determined to what physical location on disk platter 678 the data is derived, and a characteristic of that particular location. Write data is encoded based upon the region specific characteristic. Similarly, during a read operation, information accessed from disk platter 678 is processed using a method specific to the region of disk platter 678 from which it derives. the data is derived, and a characteristic of that particular location. In some cases, the read channel circuit may include circuitry similar to that discussed in relation to FIG. 3 or FIG. 4; and/or may operate similar to the methods discussed below in relation to FIGS. 5a-5c.

It should be noted that storage system 600 may be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such as storage system 600, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

A data decoder circuit used in relation to read channel circuit 610 may be, but is not limited to, a low density parity check (LDPC) decoder circuit as are known in the art. Such low density parity check technology is applicable to transmission of information over virtually any channel or storage of information on virtually any media. Transmission applications include, but are not limited to, optical fiber, radio frequency channels, wired or wireless local area networks, digital subscriber line technologies, wireless cellular, Ethernet over any medium such as copper or optical fiber, cable channels such as cable television, and Earth-satellite communications. Storage applications include, but are not limited to, hard disk drives, compact disks, digital video disks, magnetic tapes and memory devices such as DRAM, NAND flash, NOR flash, other non-volatile memories and solid state drives.

In addition, it should be noted that storage system 600 may be modified to include solid state memory that is used to store data in addition to the storage offered by disk platter 678. This solid state memory may be used in parallel to disk platter 678 to provide additional storage. In such a case, the solid state memory receives and provides information directly to read channel circuit 610. Alternatively, the solid state memory may be used as a cache where it offers faster access time than that offered by disk platted 678. In such a case, the solid state memory may be disposed between interface controller 620 and read channel circuit 610 where it operates as a pass through to disk platter 678 when requested data is not available in the solid state memory or when the solid state memory does not have sufficient storage to hold a newly written data set. Based upon the disclosure provided herein, one of ordinary skill in the art will recognize a variety of storage systems including both disk platter 678 and a solid state memory.

It should be noted that the various blocks discussed in the above application may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the invention provides novel systems, devices, methods and arrangements for out of order data processing. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A hard disk drive, the hard disk drive comprising:
a disk platter including a first region exhibiting a first quality and a second region exhibiting a second quality, wherein the first quality corresponds to an error rate of the first region and the second quality corresponds to an error rate of the second region;
a head assembly disposed in relation to the disk platter and operable to:
write a data set to the disk platter; and
provide a sensed signal corresponding to information on the storage;
a read channel circuit including:
a data write circuit operable to:
receive a write request including a write data set and a write address;
determine that the write address corresponds to the first region;
select an encoding level based at least in part on the first quality;
encode the write data set at the encoding level to yield an encoded output; and
provide the encoded output to the head assembly to be written as the data set; and
a data read circuit operable to:
receive a read request including a read address;
receive the information from the disk platter, wherein the information is accessed from a location on the disk platter corresponding to the read address;
determine that the read address corresponds to the second region;
select a processing level based at least in part on the second quality of the second region; and
apply a processing algorithm to the information, wherein the processing algorithm is selected based upon the processing level to recover a read data set from the information.

2. The hard disk drive of claim 1, wherein the hard disk drive further comprises:
a map table indicating a location of the first region and a location of the second region.

3. The hard disk drive of claim 2, wherein the hard disk drive further comprises:
a disk platter characterization circuit operable to:
write a data set to the disk platter;
repeatedly read the data set from the disk platter; and
determine the error rate for the first region and the error rate of the second region based upon processing of the data set repeatedly read from the disk platter.

4. The hard disk drive of claim 1, wherein:
the data write circuit is further operable to:
resolve the write address to a physical location on the disk platter; and
select the encoding level based on a comparison of the physical location and information from the map table; and
the data read circuit is further operable to:
resolve the read address to a physical location on the disk platter; and
select the processing level based on a comparison of the physical location and information from the map table.

5. A data processing system, the data processing system comprising:

a data write circuit operable to:
receive a write request including a write data set and a write address;
select an encoding level between at least a first encoding level having a first number of parity bits per user bit and a second encoding level having a second number of parity bits per user bit based at least in part on a quality of a region of a disk platter corresponding to the write address, wherein the disk platter includes at least a first region of a first quality and a second region of a second quality, and wherein the first number is different from the second number; and
encode the write data set at the encoding level to yield an encoded output.

6. The data processing system of claim 5, wherein the system further comprises:
a map table indicating a location of the first region and a location of the second region.

7. The data processing system of claim 6, wherein the system further comprises:
a disk platter characterization circuit operable to:
write a data set to the disk platter;
repeatedly read the data set from the disk platter; and
determine a first error rate for the first region and an error rate of the second region based upon processing of the data set repeatedly read from the disk platter, wherein the error rate of the first region corresponds to the first quality, and the error rate of the second region corresponds to the second quality.

8. The data processing system of claim 6, wherein the data write circuit is further operable to:
resolve the write address to a physical location on the disk platter; and
select the encoding level based on a comparison of the physical location and information from the map table.

9. The data processing system of claim 5, wherein the system further comprises:
a data read circuit operable to:
receive a read request including a read address;
access information from the disk platter at a location corresponding to the read address;
select a processing level based at least in part on a quality of a region of the disk platter corresponding to the read address; and
apply a processing algorithm to the information, wherein the processing algorithm is selected based upon the processing level to recover a read data set from the information.

10. The data processing system of claim 9, wherein the system further comprises:
a map table indicating a location of the first region and a location of the second region.

11. The data processing system of claim 10, wherein the data read circuit is further operable to:
resolve the read address to a physical location on the disk platter; and
select the processing level based on a comparison of the physical location and information from the map table.

12. The data processing system of claim 9, wherein the data read circuit comprises:
a variable format data decoder circuit; and
wherein applying the processing algorithm to the information includes applying a data decode algorithm selected based upon the processing level by the variable format data decoder circuit.

13. The data processing system of claim 9, wherein the data read circuit comprises:

a data decoder circuit operable to apply a data decode algorithm to a decoder input derived from the information to yield a decoded output;

a data output modifying circuit operable to remove parity from the decoded output at locations indicated by the processing level; and wherein applying the processing algorithm to the information includes removing parity from the decoded output at locations indicated by the processing level.

14. The data processing system of claim 13, wherein the data decode algorithm is a low density parity check algorithm.

15. The data processing system of claim 5, wherein the system is implemented as an integrated circuit.

16. A data processing system, the data processing system comprising:

a data read circuit operable to:

receive a read request including a read address indicating a location on a magnetic storage medium;

access information from the magnetic storage medium at a location corresponding to the read address, wherein the magnetic storage medium includes at least a first region of a first quality and a second region of a second quality;

select a processing level between at least a first processing level having a first number of parity bits per user bit and a second processing level having a second number of parity bits per user bit based at least in part on a quality of a region of the magnetic storage medium corresponding to the read address, and wherein the first number is different from the second number; and applying a processing algorithm to the information, wherein the processing algorithm is selected based upon the processing level to recover a read data set from the information.

17. The data processing system of claim 16, wherein the system further comprises:

a map table indicating a location of the first region and a location of the second region.

18. The data processing system of claim 17, wherein the data read circuit is further operable to:

resolve the read address to a physical location on the magnetic storage medium; and select the processing level based on a comparison of the physical location and information from the map table.

19. The data processing system of claim 16, wherein the data read circuit comprises:

a variable format data decoder circuit; and wherein applying the processing algorithm to the information includes applying a data decode algorithm selected based upon the processing level by the variable format data decoder circuit.

20. The data processing system of claim 16, wherein the data read circuit comprises:

a data decoder circuit operable to apply a data decode algorithm to a decoder input derived from the information to yield a decoded output;

a data output modifying circuit operable to remove parity from the decoded output at locations indicated by the processing level; and wherein applying the processing algorithm to the information includes removing parity from the decoded output at locations indicated by the processing level.

\* \* \* \* \*